United States Patent [19]

Yamada et al.

[11] Patent Number: 4,980,614
[45] Date of Patent: Dec. 25, 1990

[54] CONVERGENCE CORRECTION CIRCUIT

[75] Inventors: Takeo Yamada; Miyuki Ikeda; Toshiyuki Kimoto; Masanori Ogino; Tsuneo Fujikura; Yoshihiro Arakawa, all of Yokohama, Japan

[73] Assignee: Hitachi, Ltd., Tokyo, Japan

[21] Appl. No.: 194,305

[22] Filed: May 16, 1988

[30] Foreign Application Priority Data

May 18, 1987 [JP] Japan ................. 62-118771

[51] Int. Cl.⁵ .................. G09G 1/04; H01J 29/70
[52] U.S. Cl. ......................... 315/368; 315/367
[58] Field of Search .................. 315/367, 368; 358/10; 307/228

[56] References Cited

U.S. PATENT DOCUMENTS

| | | | |
|---|---|---|---|
| 4,422,019 | 12/1983 | Meyer | 315/368 |
| 4,623,825 | 11/1986 | Wahlquist | 315/368 |
| 4,672,275 | 6/1987 | Ando | 315/368 |
| 4,849,652 | 7/1989 | Hulshof | 315/368 |

FOREIGN PATENT DOCUMENTS 60-33791 2/1985 Japan .
2176679 12/1986 United Kingdom .

Primary Examiner—Gregory C. Issing
Attorney, Agent, or Firm—Antonelli, Terry, Stout & Kraus

[57] ABSTRACT

A convergence correction circuit according to the present invention has a phased locked loop including a programmable counter. The programmable counter has programmable count start and end points. The output of the programmable counter is supplied to a memory storing convergence distortion correcting data therein. As the horizontal screen size is increased, a value closer to the lower limit 0 of the start point as compared with that taken when the horizontal size is small is set as the count start point of the programmable counter, and a value closer to the upper limit $(2^7-1)$ of the end point as compared with that taken when the horizontal size is small is set as the count end point. In accordance with the horizontal screen size, the count start and end points of the programmable counter are changed. Correct convergence correction is performed even if the horizontal screen size is changed.

7 Claims, 15 Drawing Sheets

CONVERGENCE CORRECTION CIRCUIT

BACKGROUND OF THE INVENTION

The present invention relates to a convergence correction circuit of a display using a CRT, and in particular to such a convergence correction circuit suitable to a multiscan projection display capable of handling with a plurality of different deflection frequencies.

In a projection display, three projection tubes comprising red, green and blue tubes are typically arranged in a horizontal direction together with a projection lens to project and synthesize a color image onto a screen. Since red and blue images are projected onto the screen in a slant direction, a keystone distortion as shown in FIG. 2 is generated on the basis of projective geometry, resulting in a color shift This color shift has heretofore been corrected by mounting a convergence yoke (hereafter abbreviated as CY) onto the neck section of a projection tube. The CY being similar to a deflection yoke, supplementally deflects an electron beam by applying the output of a convergence amplification section to the CY. A correction signal applied to the CY is desired to be synchronized to the deflection scanning period and be capable of correcting a color shift pattern with high precision. There are currently known correction waveform generating means of the analog scheme types and digital scheme. Although the analog scheme is simple, it has a drawback of coarse precision. The digital scheme has high correction precision, however, it has a drawback of high cost because a large memory capacity is needed. A method for reducing the needed memory capacity is described in U.S. Pat. No. 4,422,019 issued in 1983. In accordance with that method, the screen is represented by approximately 16×16 representative points, and only the correction information of those representative points is memorized while the remaining areas are interpolated using data of the representative points. In a convergence signal generating circuit described in the U.S. Pat. No. 4,422,019, interpolation in the horizontal direction of the screen is performed by using a conventional low-pass filter, while interpolation computation in the vertical direction is performed in a digital or analog way to generate a correction signal. Such prior art is primarily suitable to one specific scanning format. However, it has a drawback that a large memory capacity is needed in application to a so-called multiscan display capable of displaying formats of a plurality of schemes which are different in horizontal scanning frequency and screen size. Even if correction is completed in one format of the multi-scan display, for example, a color shift is generated when the horizontal frequency of the display is somewhat changed, resulting in a problem Further, in case a convergence correction signal is generated in a projection display of the prior art, correction waveforms synchronized to the deflection scanning period must be generated in any case, although red is opposite to blue in polarity.

In a conventional technique, the horizontal deflection current is detected as a voltage signal by using some means, and waveforms are synthesized on the basis of the resultant voltage signal.

This conventional scheme has a problem that a color shift remains in the left end portion of the screen. The reason will now be described. The above described waveform synthesis processing needs a finite delay time. The delay time typically has a value equivalent to approximately 2 to 3% of a horizontal period. Since a picture of a CRT is formed by the horizontal scanning and the vertical scanning, the left end portion of the screen corresponds to the position immediately after the high-speed horizontal retrace line. Since the correction signal information reaches there late, the color shift remains in a portion located at the left end portion of the screen and occupying approximately 2 to 3% of the total screen width.

Further, in the conventional scheme, if the deflection frequency changes, the voltage amplitude and phase of a parabolic signal changes, resulting in deterioration of picture quality.

SUMMARY OF THE INVENTION

An object of the present invention is to provide a correction circuit capable of reducing a picture distortion such as the color shift even for various signal sources which are different in horizontal scanning frequency.

Another object of the present invention is to provide a horizontal interpolation scheme which is free from the above described drawbacks of the prior art and which is able to deal with a wide variety of formats with a small capacity of memory.

Still another object of the present invention is to reduce the color shift.

A preferred embodiment of a convergence correction circuit according to the present invention includes a triangular wave generation circuit for generating symmetric triangular waves in accordance with the period of the spacing of representative grid points put in sequence in the horizontal direction of the screen, and a weighted average circuit connected to the symmetric triangular wave generation circuit so as to derive the weighted average of even-numbered color shift correction data related to even numbered grid points and odd-numbered color shift correction data related to odd numbered grid points by using the symmetric triangular waves. Since the presumption precision of the scanning line position is raised on the basis of introduction of an originating a virtual coordinate system based upon hypothetical scanning lines having several times as many lines as real scanning lines, it is possible to suppress irregular luminance impairment of a reproduced picture caused by the rounding deviation of the position presumption within a permissible limit. Therefore, formats having different numbers of scanning lines can also be continuously dealt with.

DESCRIPTION OF THE PREFERRED EMBODIMENTS

Figure 1:
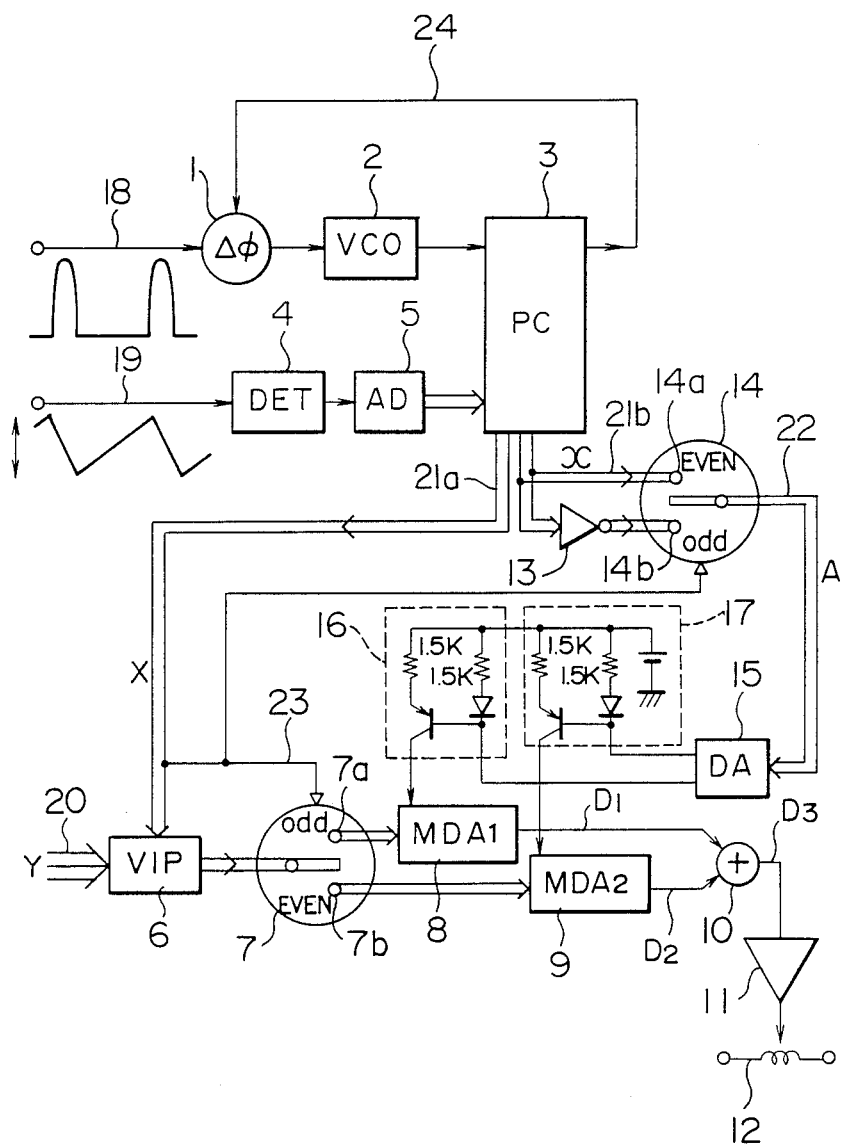
FIG. 1 is a circuit diagram showing a first embodiment of the present invention.

A first embodiment of the present invention is shown in FIG. 1. The configuration and operation of FIG. 1 will now be described.

In FIG. 1, numeral 1 denotes a phase detector, and numeral 2 denotes a voltage-controlled oscillator having an oscillation frequency of approximately 1.6 MHz. Numeral 3 denotes an 8-bit programmable counter (PC), whose output 24 comprises pulses of approximately 64 kHz. The output 24 of the PC 3 is negatively fed back to the phase detector 1 and compared in timing with the input horizontal synchronization signal supplied to an input 18 or a horizontal retrace line pulse generated by a separate horizontal deflection circuit. The circuit functions as a well-known Phase Lock Loop (PLL) loop as a whole. Since the repetition frequency $f_H$ of the input horizontal retrace line pulse signal varies from 16 kHz to 80 kHz depending upon the signal source, the oscillation frequency of the voltage-controlled oscillator (hereafter abbreviated to VCO) 2 varies from approximately 4 MHz to 20 MHz correspondingly thereto.

The programmable counter (hereafter abbreviated to PC) 3 applies frequency demultiplication to the output of the VCO at a ratio of approximately $$\frac{1}{2^8} = \frac{1}{256}$$

and sends out output pulses 24 having the same frequency and timing as those of the input $f_H$. The peak-to-peak amplitude of a signal 19 proportional to the horizontal deflection current is detected in an envelope detection circuit 4 to produce a DC voltage at an output terminal of the envelope detection circuit 4. This DC voltage has a value nearly proportional to the horizontal size of the screen.

The DC voltage is converted into a digital signal having approximately 7 bits by an A-D converter 5. The A-D converter 5 need not be an expensive A-D converter for successively digitizing a high speed AC signal, but a well-known inexpensive commercially available A-D converter which simply converts a DC voltage into a digital value can be used. In drawings of the present application, multiple lines represent the flow of digital signals, while single lines represent the flow of analog signals or one-bit digital signals.

The digital signal representing the horizontal size of the screen is applied to a program terminal of the PC 3 as described later. The PC 3 includes a first section and a second section. The first section is an up counter which counts up from 0 to $2^7-1$ and which has a programmable count start point. The second section is an up counter which counts up from 0 to $(2^7-1)$ succeedingly after the count of the first section and which has a programmable count end point. In other words, the PC 3 as a whole is equivalent to a single 8-bit counter in which the count start point and the count end point are respectively programmable. Into 7 bits of the count end point of the second section of the PC 3, the output of the A-D converter is set.

Into the count start point of the first section, one's-complement of the output of the A-D converter 5 is set. If the horizontal size is increased, for example, the first section of the PC 3 starts to count up with the start point closer to the lower limit 0 as compared with that taken when the horizontal size is small. The second section terminates counting with the end point closer to the upper limit $(2^7-1)$ as compared with that taken when the horizontal size is small. At the moment of termination, the PC 3 generates the output pulse 24 and concurrently returns to a value of the start point to resume the count up.

Information of respective bits of the PC 3 is used as an 8-bit address signal 21a and 21b which represents a horizontal position on the screen. Four high-order bits 21a correspond to 16 or less representative grid points obtained by sampling the screen in the horizontal direction.

The horizontal address signal 21a comprising 4 high-order bits is applied to a well-known vertical interpolation processing section (VIP) 6 together with an address signal 20 of the vertical direction produced by different means which will be disclosed later in FIG. 14. Data of approximately 16×16 representative grid points are stored in the VIP 6. EPROM means capable of rewriting the data by a well-known technique is also contained in the VIP 6. Further, well-known means for generating vertically interpolated digital data used for color shift correction as its output is also contained in the VIP 6. Although not illustrated, low-order bits of the horizontal address 21a are also applied to the VIP 6 to function as the timing clock of the digital processing. The output of the VIP 6 is supplied to a data selector 7. A different input 23 is supplied to the data selector 7 at its control terminal The input 23 is a signal representing the least significant bit (LSB) among the 4 high-order bits of the horizontal address 21a. When the input 23 is "1", the data selector 7 is connected to an output terminal of odd side thereby selecting data representing odd numbered grid points. When the input 23 is "0", the data selector 7 is connected to an output terminal 7b of even side thereby selecting data representing even numbered grid points. Outputs of the odd side and even side are supplied to DA converters having multipliers MDA1 8 and MDA2 9, respectively. As the MDA1 8 and the MDA2 9, AD 1508 produced by Analog Devices, for example, may be used. Analog outputs of the DA converters are added in an adder 10. The resultant sum is supplied to a coil 12 of a convergence yoke via an amplifying section 11. The current flowing through the coil 12 applies the supplemental deflection to the electron beam of the CRT to perform the required correction for the color shift.

On the other hand, 4 low-order bits 21b of the horizontal address signal are connected to an even-side input terminal 14a of a data selector 14 and an inverter 13. The output of the inverter 13 is connected to an odd-side input terminal 14b of the data selector 14. Depending upon the value (1 or 0) of the control input 23 supplied to a control terminal of the data selector 14, the signal of the odd or even side input of data selector 14 related to odd and even numbered grid points respectively is obtained at the output of the data selector 14. The output of the data selector 14 is supplied to a D-A converter 15. As the D-A converter, a portion of the same converter as the already described MDA1 8 corresponding to 4 high-order bits can be used. A pair of analog current outputs are produced by the D-A converter. The D-A converter 15 is so configured that the sum of the pair of output currents may be constant. The already described AD 1508 has this property. If the AD 1508 is not available, however, a conventional single-output D-A converter and an operational amplifier for inverting the output of the conventional single-output D-A converter may be used. In any case, the pair of current outputs having a complementary relation are supplied to analog multiplication terminals of the already described MDA1 and MDA2 via current mirror circuits 16 and 17.

The operation of the inverter 13 and the data selector 14 will now be described. In reality, the signal 21b is an address signal comprising 4 bits. For clearer understanding, however, it is now assumed that the signal 21b comprises 2 bits. Assuming now that the signal 21b is X and the output of the inverter 13 is $\overline{X}$ an output 22 of the data selector can be represented as A shown below.

| control input | 23 | 0, | 0, | 0, | 0, | 1, | 1, | 1, | 1, | 0, | 0 ... |
|---|---|---|---|---|---|---|---|---|---|---|---|
| | X | 00, | 01, | 10, | 11, | 00, | 01, | 10, | 11, | 00, | 01 ... |
| | $\overline{X}$ | 11, | 10, | 01, | 00, | 11, | 10, | 01, | 00, | 11, | 10 ... |

-continued

| A | 00, 01, 10, 11, 11, 10, 01, 00, 00, 01 ... |
|---|---|

That is to say, it is understood that the output A forms a triangular wave which rises when the signal at the control input 23 is 0 and which falls when the signal at the control input is 1.

Figure 3:
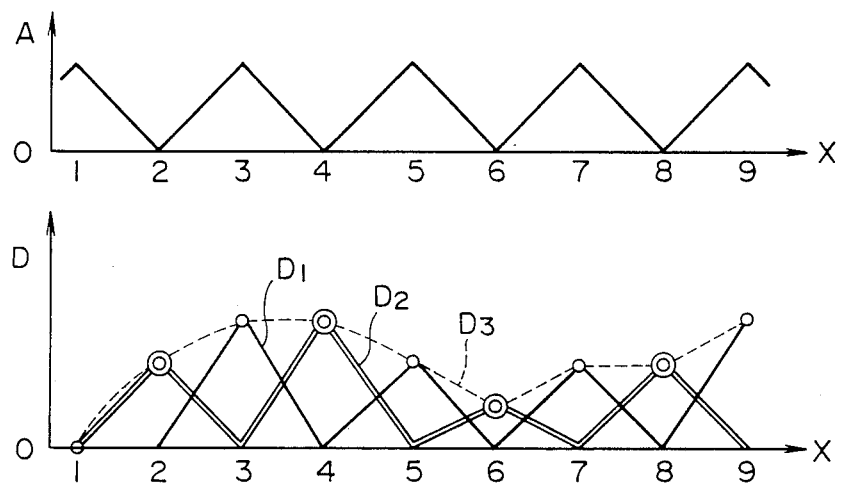
FIG. 3 shows waveforms of a principal part of the first embodiment illustrated in FIG. 1.

Portions denoted by numerals 15, 16, 17, 8 and 9 in FIG. 1 will now be described. The waveform of the output current of the D-A converter 15 shown in FIG. 1 having a positive polarity is represented by A of FIG. 3. The abscissa indicates an address (X=0 to 15) represented by 4 high-order bits of the horizontal address 21a. The above described property that the output A rises until the value of X passes through an even number and reaches the next odd number and the output A falls until the value of X passes through an odd number and reaches the next even number is shown. The output current of this positive polarity is supplied to the multiplication terminal of the multiplying DA converter MDA1 8 via the current mirror circuit 16. The output signal of the MDA1 8 has a waveform $D_1$ of FIG. 3 represented by a single solid line. That is to say, it is understood that the output signal has a waveform obtained by applying horizontal interpolation to data of representative grid points with X=odd.

On the other hand, the other output, i.e., the complementary output of the D-A converter 15 is supplied to the MDA2 9 via the current mirror circuit 17. The output of the MDA2 9 has a waveform $D_2$ as represented by double solid lines in FIG. 3. This waveform is equivalent to a waveform obtained by applying horizontal interpolation to data of representative grid points with X=even. Finally, a signal having a waveform represented by a broken line $D_3$ in FIG. 3 is obtained at the output of an adder 10 of FIG. 1. As a result, a desired waveform resulting from applying horizontal interpolation to data of respective representative grid points is obtained.

By using the configuration of FIG. 1 heretofore described, it becomes possible to continuously track various formats, which are different in horizontal scanning frequency $f_H$ and horizontal screen size, and correct color shifts.

Because a change in $f_H$ can be tracked by the function of the PLL comprising the phase detector 1, VCO 2 and PC 3 of FIG. 1 and a change in horizontal screen size can be tracked with the count start point and the count end point by the configuration of the envelope detector 4, AD 5 and PC 3 as already described.

As means for horizontal interpolation, the prior art simply makes use of the fact that the impulse response of an analog low-pass filter is triangular. Since the duration width of the triangular wave is constant, it is necessary to prepare a plurality of LPF's and change between them to obtain formats which are different in horizontal deflection speed.

If the horizontal deflection speed changes in the present embodiment, the repetition period of the triangular wave changes correspondingly. As a result, the distance width corresponding to the repetition period of the triangular wave on the screen can be kept nearly constant, continuous tracking being attained.

Figure 4:
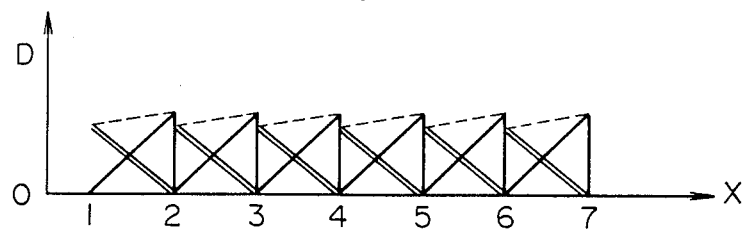
FIG. 4 is a diagram used for explaining a conventional problem.

In the conventional technique described in the U.S. Pat. No. 4,422,019, a multiplying D-A converter is used not for horizontal interpolation which is the object of the present invention, but for vertical interpolation within the VIP 6 of FIG. 1. In these conventional techniques, however, a component corresponding to the inverter 13 of FIG. 1 of the present embodiment is not shown. Accordingly, a change in address signal comprising 4 low-order bits at the output terminal 22 does not form triangular waves disposed at intervals of two grids so as to have symmetric ascending and descending portions as shown in FIG. 3, but form sawtooth waves having descending portions reset to momentarily descend at intervals of one grid. If it is attempted to use this mode for the purpose of horizontal interpolation, a drawback of uneven correction impairment is caused as described below. In this mode, the even side of the data selector 7 shown in FIG. 1 is converted into left adjacent grid point data, and the odd side is converted into right adjacent grid point data. Accordingly, even data and odd data alternately appear at the MDA1 8 and MDA2 9 at intervals of one grid space. Even if a slight mutual deviation exists between conversion gains of the MDA1 8 and the MDA2 9, therefore, it causes impairment on the picture in the vicinity of grid points as changes in the amount of electron beam deflection. Especially, there is a problem that the scanning line rolls like a sawtooth waveform when the electron beam undergoes supplementary deflection caused in a longitudinal direction by the convergence yoke 12. For example, the scanning line rolls like sawtooth waveforms as represented by broken lines in FIG. 4. FIG. 4 shows that ripples are caused even when the correction datum itself always assumes a constant value. In the form of the conventional technique, therefore, gains of D-A converters with analog multipliers contained therein corresponding to the MDA1 8 and MDA2 9 must be adjusted with extreme precision.

In the configuration of FIG. 1, the demand for the gain deviation of the MDA1 8 and MDA2 9 is largely moderated by the function of the novelly devised inverter 13, nonadjustment being attained.

Because the MDA1 8 deals with only data corresponding to odd addresses and the MDA2 9 deals with only data corresponding to even addresses, and hence the gain deviation can be easily corrected by rewriting digital data for correction stored in the VIP 6.

Another merit of the configuration of FIG. 1 as compared with the prior art is that the configuration of FIG. 1 withstands transitional glitch disturbance caused when the output analog values of the MDA1 8 and MDA2 9 suddenly change. The reason will now be described. In FIG. 3, the input to the MDA1 8, for example, is changed over from color shift correction data corresponding to $X=3$ to color shift correction data corresponding to $X=5$ at timing $X=4$. And the weighting coefficient of the MDA1 8 is approximately zero as indicated by single solid lines of FIG. 3 at timing $X=4$. Accordingly, the glitch disturbance is suppressed.

In the present embodiment, the VIP 6 of FIG. 1 is shown as a digital processing system. However, the above described analog interpolation scheme withstanding nonuniformity may also be applied to the vertical interpolation function of the VIP 6. This will be described later as a version.

Merits of the configuration of FIG. 1 have heretofore been described. Its some remained demerits and the means of eliminating the demerits will now be described.

First of all, an important fact to be noted is that the value of the 8-bit address generated by the PC 3 of FIG. 1 should be considered to be present not on an annular cyclic coordinate system but on a nonannular coordinate system which is cut and reset from the end point to the start point at the start time of the horizontal retrace line. In the conventional digital convergence system, the PC 3 is dealt as an annular coordinate system which always counts from 0 to $2^8-1$. In the annular coordinate system, the delay time for digital signal processing in the VIP 6 can be easily overcome by simply using a cyclic shift of the address value corresponding to the delay time. Because the start point and the end point are no more than two adjacent points on the annular coordinate system.

In the nonannular coordinate system, however, the start point and the end point are disposed at extremities and are completely different. In FIG. 1, therefore, it is necessary that the timing of the count start of the PC 3 precedes the timing of the start of the horizontal scanning at the left end of the screen by at least the delay time of the processing system.

Figure 7:
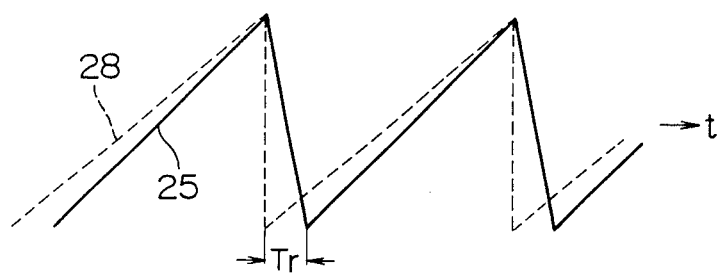

In the circuit of FIG. 1, timing relationship between the address value of the output of the PC 3 and the horizontal deflection scanning becomes as indicated by waveforms of FIG. 7, where the abscissa represents time t. In FIG. 7, numeral 25 denotes a horizontal deflection position or a horizontal deflection current, and numeral 28 denotes an address output value. As evident from FIG. 7, the timing of the count start precedes the timing of the horizontal scanning start by the horizontal retrace line interval Tr. On the other hand, it is understood from the description made before by referring to FIG. 3 that the delay time of the processing system of FIG. 1 is incidentally delayed by an amount corresponding to $\Delta X=1$ in performing horizontal interpolation. This is equivalent to approximately 1/16 of the horizontal period. On the other hand, the horizontal retrace line interval Tr is approximately 1/6 of the horizontal period. In addition, some delay is caused in the VIP 6 and a processing amplifier section 11. However, the total delay time is generally 1/6 or less of the horizontal period. Therefore, the above described necessary condition is satisfied. Accordingly, operation nearly complying with a request is performed. However, the operation is somewhat distant from the ideal operation.

Figure 5:
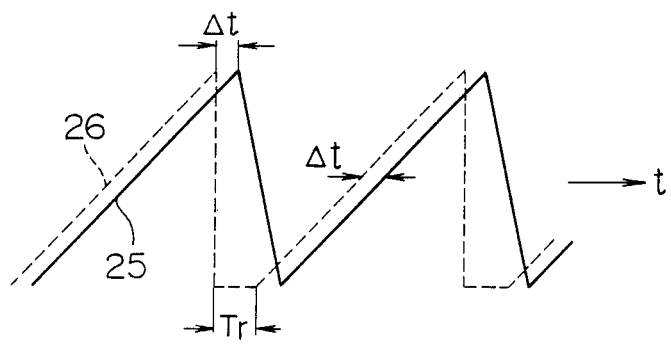
FIGS. 5, 6 and 7 show waveforms of a principal part of the present invention.
Figure 6:
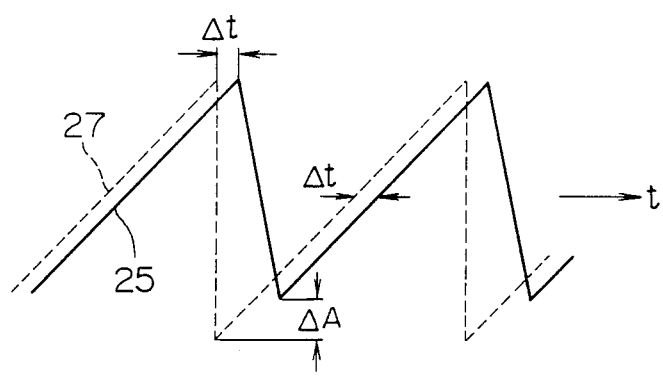

For approaching the ideal operation, two typical satisfactory conditions exist. These address values are represented by broken line waveforms of FIGS. 5 and 6. In FIGS. 5 and 6, the abscissa represents time t, and a waveform 25 is identical to the waveform 25 of FIG. 7. FIGS. 5 and 6 have a common property that the address value precedes the scanning movement 25 of the electron beam by time $\Delta t$ in an ascent process, i.e., a horizontal scanning interval. This $\Delta t$ is so set as to be nearly equal to the total delay time of the convergence circuit. Amounts Tr and $\Delta A$ will be described later.

Figure 8:
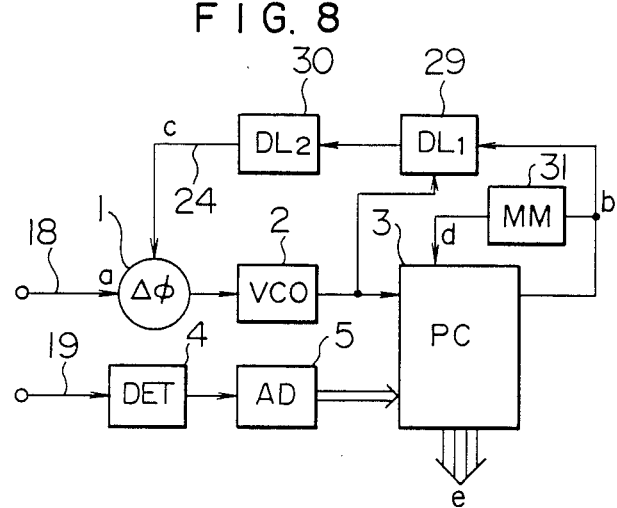
FIG. 8 shows a circuit diagram of a second embodiment of the invention.
Figure 10:
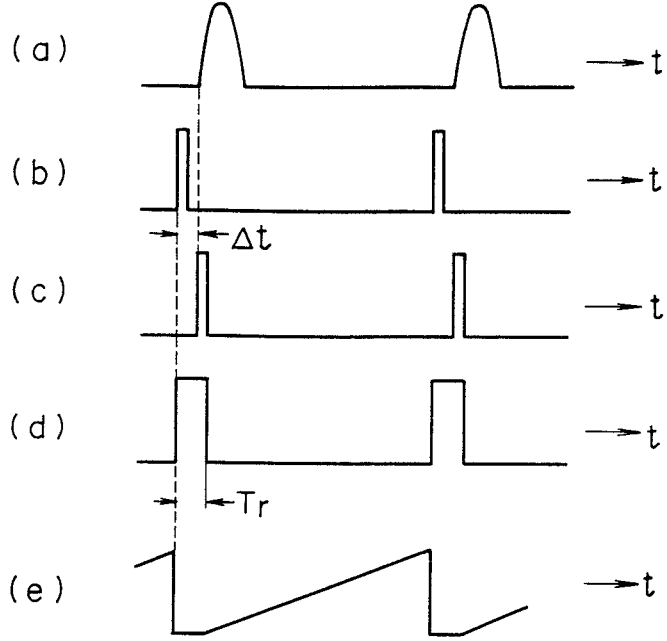
FIG. 10 shows waveforms of the principal part of the second embodiment.
Figure 11:
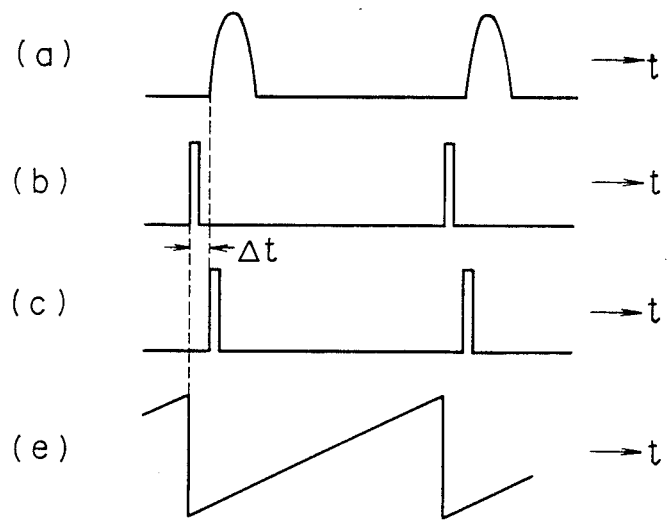
FIG. 11 is a waveform diagram used for explaining the embodiment of FIG. 9.

FIG. 8 shows the second embodiment. This circuit aims at deriving the address value indicated by broken lines of FIG. 5. FIG. 5 principally shows a portion which is different from that of FIG. 1. Remaining portions are the same as those of FIG. 1. Operation waveforms of FIG. 8 are shown in FIG. 10. FIGS. 10a to 10e show waveforms appearing at points a to e of FIG. 8.

In FIG. 8, $DL_1$ 29 and $DL_2$ 30 denote pulse delay circuits. The $DL_1$ 29 delays a signal by a time nearly equivalent to the already described delay time of the VIP 6, MDA1 8 and MDA2 9 shown in FIG. 1. Since this delay time is equal to an integer times as long as clock period, the $DL_1$ 29 can comprise a shift register for shifting the timing waveform of FIG. 10b by using the output signal of the VCO 2 as a clock.

The DL$_2$ 30 is provided for correcting the delay caused by the analog amplifier section 11 of FIG. 1. This value is typically equal to approximately 0.1 to 1 μsec and is a fixed value which does not depend upon the format of the input signal. Accordingly, a monomultivibrator having a pulse width set equivalent to the delay value can be used as the DL$_2$ 30. In FIG. 8, MM 31 denotes a monomultivibrator having a pulse width set nearly equal to or somewhat shorter than the retrace line interval Tr of the horizontal deflection circuit. The output pulse of the MM 31 is applied to a disenable terminal of the PC 3. While the output pulse of the MM 31 is applied, the PC 3 ceases from counting Waveforms as shown in FIGS. 10a to 10e are thus obtained. The waveform of FIG. 10e is identical with the desired waveform 26 represented by borken lines in FIG. 5.

Figure 9:
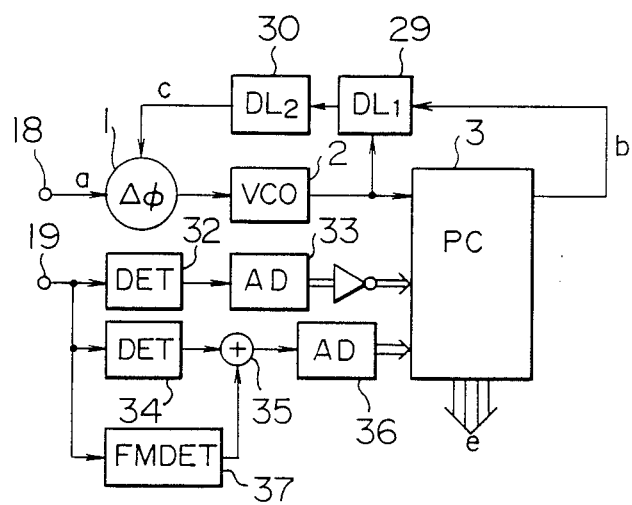
FIG. 9 shows a circuit diagram of a third embodiment of the invention.

FIG. 9 shows a third embodiment. Numerals 29 and 30 are the same as those of FIG. 8. Numeral 32 denotes an amplitude detector for detecting the minimum value of the horizontal deflection sawtooth wave 19 corresponding to the left end of the screen as a DC voltage. Numeral 33 denotes a 7-bit A-D converter. The output of the A-D converter. The output of the A-D converter 33 is converted into one's complement bit by bit and supplied to the PC 3 to set the count start point of the PC 3. Numeral 34 denotes an amplitude detector for detecting the maximum value of the horizontal deflection sawtooth wave. The output of the amplitude detector 34 is added to the output of a frequency detector 37. The resultant sum is supplied to the PC 3 via an A-D converter 36 to set the count end point of the PC 3. Waveforms appearing at points a, b, c and e of FIG. 8 are shown in FIG. 10. Therefore, it is understood that the waveform 27 represented by broken lines of FIG. 6 is obtained as the horizontal address signal e.

The FMDET 37 functions to correct ΔA illustrated in FIG. 6. A multiscan display typically operates so that the retrace line interval of the horizontal deflection circuit may be constant and only the scanning interval may change even if the horizontal scanning frequency $f_H$ of the input signal is raised.

Therefore, the magnitude of ΔA of FIG. 6 increases nearly in proportion to $f_H$. It is thus understood that the amount ΔA can be compensated by the function of the FMDET 37 and the adder 35 shown in FIG. 9.

The DET 32 and the DET 34 can be constituted by using a well-known amplitude detector circuit comprising a diode and a capacitor. Further, a well-known frequency detector of pulse count scheme can be used as the FMDET 37. Three embodiments have heretofore been described. However, intermediate versions between them may be used, or a part of the function may be replaced by a microcomputer.

Figure 12:
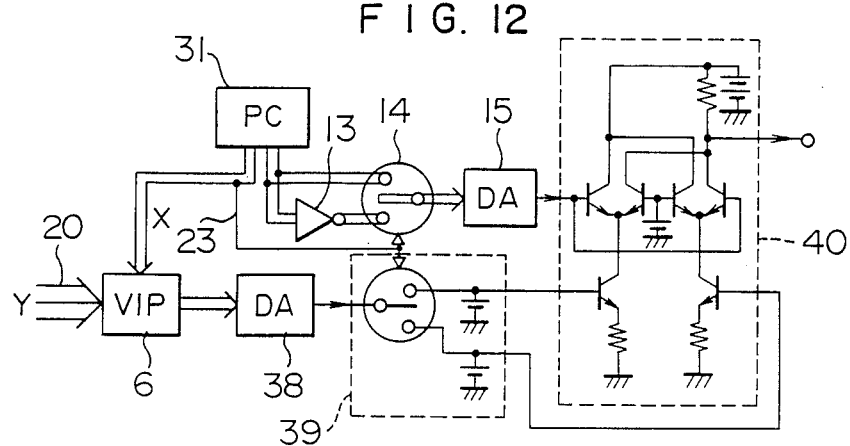
FIG. 12 is a circuit diagram showing a primary part of the fourth embodiment.

FIG. 12 shows a fourth embodiment obtained by modifying the latter half portion of FIG. 1. Numerals 3, 6, 13, 14, 15 and 23 of FIG. 12 are the same as those of FIG. 1. Numeral 38 denotes a D-A converter, and numeral 39 denotes a sample-and-hold circuit. Odd data D$_1$ are obtained at an upper output of the sample-and-hold circuit 39, while even data D$_2$ are obtained at a lower output of the sample-and-hold circuit 39. Numeral 40 denotes a weighted average circuit. Assuming that a weighting coefficient is W, the output of the weighting average circuit 40 is represented as $$D_3 \alpha W D_2 + (1-W) D_1 \tag{1}$$

Assuming that differential voltage applied to base electrodes of four transistors located at the upper side of the circuit 40 is E, the weighting coefficient W is given by $$W = \frac{1 + \tanh\frac{qE}{2KT}}{2} \tag{2}$$

where
K: Boltzmdnn's constant
T: absolute temperature
q: charge of electron $$\frac{2KT}{q} \approx 60 \text{ mV}.$$

By selecting approximately ±100 mV as the peak-to-peak value of the triangular differential voltage E, therefore, it follows that $$W = \frac{1 + \tanh\frac{\pm 100 \text{ mV}}{60 \text{ mV}}}{2} = 0.97, 0.03.$$

Weighting coefficients nearly satisfying the requested condition W=1 to 0 are thus obtained. As a result, color shift correction data horizontally interpolated are obtained at the output of the weighted average circuit 40.

Description of the fourth embodiment is terminated here. Simplified versions complying with application will now be described.

In application in which the horizontal screen size is nearly constant, the count start point and end point of the PC 3 can be fixed. That is to say, the PC 3 need not be a programmable counter in this case, but may be simply a counter capable of counting from 0 to $2^8-1$.

Further, in application in which the horizontal screen size need not be continuously changed but can be simply switched between several sizes, the count start point and end point ma be simply set and changed over by using a mechanical switch or a microcomputer.

Figure 2:
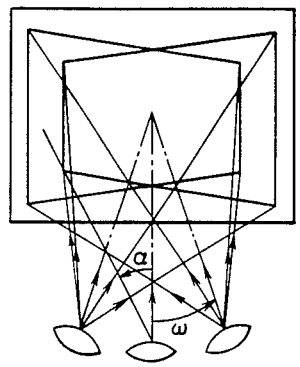
FIG. 2 is a diagram used for explaining a state of color shift.

Although not illustrated in FIGS. 2 and 3, a portion of the second embodiment shown in FIG. 8 or the third embodiment shown in FIG. 9 corresponding to the numerals 15, 16, 17, 8, 9 and 10 of FIG. 1 may be replaced by a digital weighting average circuit and a D-A converter. As an example, an embodiment combined with FIG. 8 is shown in FIG. 13 as a fifth embodiment.

Figure 13:
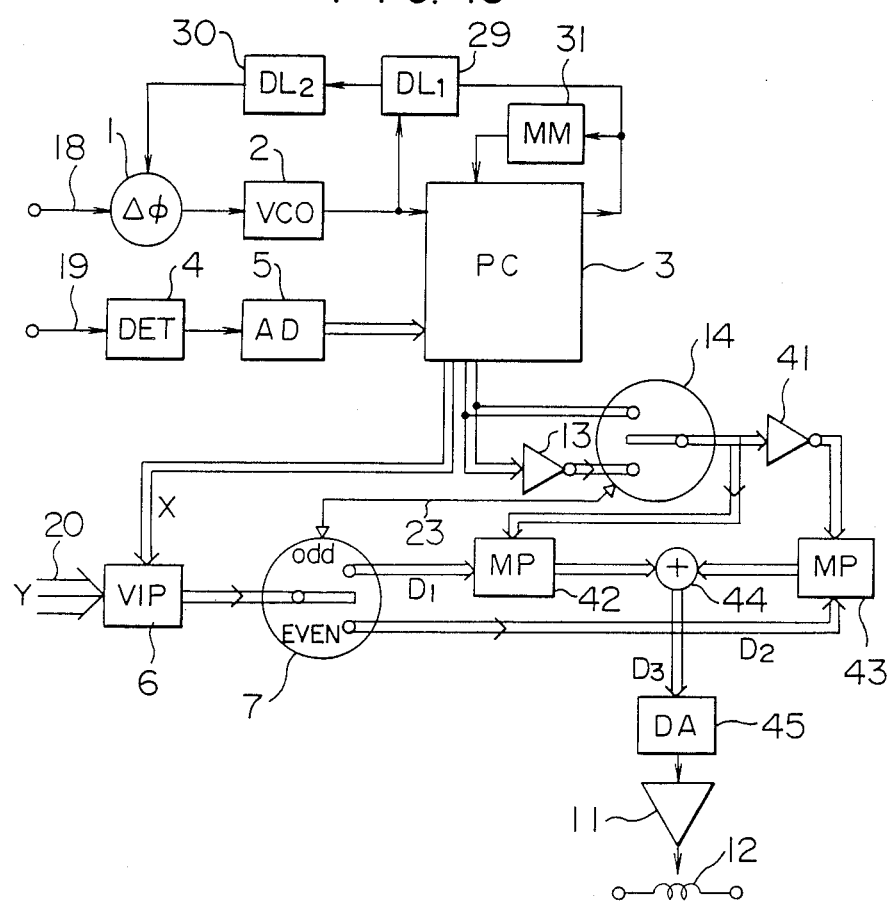
FIG. 13 is a circuit diagram showing a primary part of the fifth embodiment.

In FIG. 13, a portion comprising the circuits 1, 2, 3, 4, 5, 18, 19, 29, 30 and 31 is the same as that of FIG. 8. And a portion comprising the circuits 6, 7, 13, 14, 20, 23, 11 and 12 is the same as that of FIG. 1. An inverter 41 is used for deriving a digital value of a triangular wave having a complementary polarity. Numerals 42 and 43 denote digital multipliers, 44 a digital adder, and 45 a DA converter. In operation, weighting calculation similar to the expression (1) is performed.

Under the present state of the digital technique, the fifth embodiment is disadvantageous as compared with the form of FIG. 1 because the multipliers 42 and 43 are expensive. However, it is presumed that the fifth embodiment will become conversely more advantageous configuration as a result of technical advancement.

In that case as well, the function of delay elements 29 and 30 of FIG. 13 based on the nonannular horizontal address coordinate system which has been made clear in the consideration process of the present invention is regarded as an important technique for implementing a digital convergence circuit of continuous tracking type.

Irregular luminance impairment caused when data lack in the number of bits will now be described.

Assuming that the magnitude of the lowest bit is 1 LSB (least significant bit), a digitized datum cannot help generating a rounding error of $\pm\frac{1}{2}$ LSB. In general, the permissible limit of color shift deviation is approximately one pixel. Pixel refers to the size of the minimum unit constituting the screen. In the vertical direction, a space between scanning lines correspond to a pixel. In the description of the present invention, it is hereafter assumed that the screen comprises approximately $1000 \times 1000$ pixels at most. An ultrahigh definition display for application of CAD/CAM nearly corresponds to this. The limit of impairment perception is approximately 0.25 pixel. Accordingly, it is desirable that the deviation of $\frac{1}{2}$ LSB does not exceed 0.25 pixel.

On the other hand, the maximum amount of color shift between green/red to be corrected (which is equal in magnitude and opposite in polarity between red/blue) is nearly in proportion to a concentration angle $\omega$ and a horizontal field angle $\alpha$ illustrated in FIG. 2. The maximum peak-to-peak value L of shift in the vertical direction can be related to the height H of the screen as $$L \approx \omega \tan \alpha \cdot H \qquad (3)$$

Assuming now that $\omega = 0.1$ rad and $\tan \alpha = 0.5$ as a practical example, it follows that $$L \approx 0.05 \times H = 50 \ h \qquad (4)$$

where h represents the size of one pixel and $$h = \frac{H}{1000}$$

That is to say, L is approximately equal to 50 pixels. This color shift deviation can be reduced to approximately 1/7, i.e., approximately 7 h by a separately incorporated analog convergence circuit.

This must be further decreased by a digital convergence circuit. Accordingly, the maximum range M to be dealt with by the digital convergence circuit becomes $$M \approx 7 \ h \qquad (5)$$

From the above described limit of color shift perception, 1 LSB $\approx 0.5$ h. Accordingly, the necessary number n of bits of digital data can be calculated as $$n \approx \log_2 \frac{7 \ h}{0.5 \ h} = \log_2 14 \approx 4 \qquad (6)$$

That is to say, approximately 4 bits seem sufficient.

Unadvantageously, however, this is a necessary condition and not a satisfactory condition. Certainly, the precision of 4 bits is sufficient for a color shift itself. However, there is a different problem of irregularity of luminance caused by a rounding error. This is caused by a fact that gaps between sample points are not uniform. That is to say, it is caused by a fact that the brightness looks high where the scanning lines are dense and the brightness looks low where the scanning lines are sparse. This is remarkable especially in a monochromatic picture comprising red color alone, for example The perception limit of irregularity of luminance caused by irregularity of scanning line density is as extremely severe as approximately 3% in a value converted into a relative change of density. Accordingly, the magnitude of LSB should be smaller not only than 0.5 h satisfying the limit of color shift perception but also than 0.03 h satisfying the limit of irregularity of luminance. Therefore, the required number of bits can be represented by $$n \approx \log_2 \frac{7 \ h}{0.03 \ h} = \log_2 233 \approx 8 \ \text{bits} \qquad (7)$$

and $$1 \ LSB \leq 0.03 \ h \qquad (8)$$

That is to say, approximately 8 bits are required In the conventional technique, therefore, 8-bit digital data were typically used.

Figure 14:
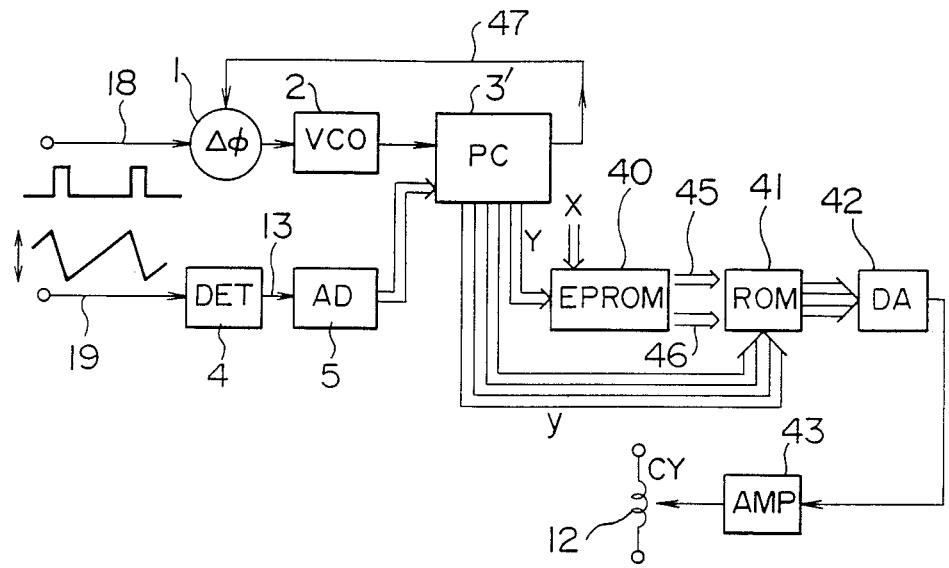
FIG. 14 is a circuit diagram of a sixth embodiment of the present invention.

A sixth embodiment of the present invention in which the irregularity of color, heretofore described is prevented is shown in FIG. 14. The configuration and operation of FIG. 14 will now be described.

Numeral 1 denotes a phase detector, and numeral 2 denotes a voltage controlled oscillator having a frequency of approximately 240 kHz. Numeracal 3' denotes a 12-bit programmable counter, which sends out an output 47. The output 47 comprises pulses of approximately 60 Hz. The output 47 is negatively fed back to the phase detector 1 and compared in timing with the input vertical synchronization signal at an input 18 or vertical retrace line pulse generated by a different vertical deflection circuit, resulting in the function of a well-known PLL loop as a whole. The repetition frequency fv of the input vertical synchronization signal changes from 40 Hz to 120 Hz in accordance with the signal source. The frequency of the voltage controlled oscillator (hereafter abbreviated to VCO) 2 correspondingly changes from approximately 160 kHz to 480 kHz. In the programmable counter (hereinafter abbreviated to PC) 3', the frequency is multiplied with a ratio of approximately $\frac{1}{2^{12}} \approx 1/4000$, resulting in the output pulse 47 which agrees in frequency and timing with the input fv. A digital signal representing the vertical screen size outputted from the A-D converter is applied to a program terminal of the PC 3' as described later. The PC 3' includes a first section and a second section The first section is an up counter which counts up from 0 to $2^{11} - 1$ and which has a programmable count start point in the same way as the PC 3 of FIG. 1. The second section is an up counter which counts up from 0 to $(2^{11} - 1)$ succeedingly after the count of the first section and which has a programmable count end point.

The output of the A-D converter 5 is set into 7 high-order bits among 11 bits of the count end point for the second section of the PC 3'. Remaining low-order bits are always set to 0. Into 7 high-order bits of the count start point of the first section, one's complement of the output of the A-D converter 5 is set. Into its remaining low-order bits, 1's are set. If the vertical size is increased, for example, therefore, the first section of the PC 3' starts count up from a value closer to the lower limit 0 of the start point, and the second section terminates counting with a value closer to the upper limit $(2^{11} - 1)$. At the moment of count termination, the PC 3' generates the output pulse 47 and concurrently returns to the value of the start point to resume the count up.

Information of respective bits of the PC 3' is used as a 12-bit address signal on the newly adopted vertical virtual coordinate system based upon hypothetical scanning lines. Four high-order bits thereof correspond to 16 or less representative grid points obtained by sampling the screen in the vertical direction.

This is applied to an EPROM (electrically rewritable memory) 40 together with the 4-bit horizontal address signal generated by some different means similar to conventional means. Horizontal addresses 0 to 15 correspond to 16 or less sample points splitting the horizontal width of the screen. Data respectively corresponding to $16 \times 16$ sample points are stored in the EPROM 40. These data can be rewritten by well-known means.

Each datum corresponding to a sample point has two groups, each group comprising 4 bits. The first group comprising 4 bits corresponds to a datum for correcting color shifts at upper adjacent sample points on the screen. And the second group comprising 4 bits corresponds to data of lower adjacent sample points on the screen.

These data are read out from the EPROM onto signal lines as an upper adjacent datum 45 and a lower adjacent datum 46 as shown in FIG. 14. The information represented by these 8 bits in total is applied to a ROM (read-only memory) 41 for vertical interpolation as an address input. The information comprising the remaining 8 low-order bits of the 12-bit address signal on the above described newly adapted virtual vertical coordinate system based upon hypothetical scanning lines is also supplied to the ROM 41 as the address signal. Therefore, the total number of addresses becomes $$2^4 \times 2^4 \times 2^8 \approx 64 \text{ K}$$

A datum of 1 byte based on the interpolation formula is stored at each address. Accordingly, the total capacity is 64 K bytes.

The interpolation formula is represented as $$D_{y,8} = D_{Y,4} + (D_{Y+1,4} - D_{Y,4}) \frac{y}{256} \quad (9)$$

where $D_{y,8}$: 8-bit datum outputted by the ROM y represents a value of 8 low-order bits of the vertical address $D_{Y,4}$: 4-bit input of the upper adjacent sample Y represents a value of 4 high-order bits of the vertical address $D_{Y+1,4}$: 4-bit input datum of the lower adjacent sample.

The relationship between the virtual vertical coordinate system based upon hypothetical scanning lines which form a kernel of the present embodiment an irregularity of luminance will now be described.

Since y is an integer in the expression (4), the magnitude of LSB is 1. On the other hand, the maximum value contained in ( ) of the expression (9) corresponds to M=7 h on the basis of the above described expression (5). Accordingly, the magnitude $\epsilon$ of LSB in $D_{y,8}$ is represented as $$\epsilon = 7h \times \frac{1}{256} = 0.027 h \quad (10)$$

It is understood that this magnitude just satisfies the perception limit specification of irregularity of luminance represented by the expression (8).

On the contrary, if a conventional coordinate system based on actual scanning lines is selected in the same way as the prior art, the number of scanning lines per sample section becomes $$\frac{1000}{16} \approx 70.$$

Accordingly, the value 256 of the expression (9) is changed to approximately 70. The value of $\epsilon$ in the expression (10) thus becomes approximately 0.1 h, resulting in very remarkable irregularity of luminance. Therefore, the prior art was a scheme which posed no problem only in the so-called single scan display having a fixed vertical frequency and a fixed vertical size.

In a single scan scheme based on the prior art, a coordinate system having as many lines as the actual scanning lines was adopted. In the system of the prior art, therefore, the components 1, 2, 3', 4 and 5 of FIG. 14 were not present. Actual scanning lines were counted by a counter for counting simply horizontal retrace line pulse i.e., a scanning line counter instead of the component 3'. The principle, therefore, a problem of line count precision, i.e., a problem of rounding error was not present. Instead, different EPROM data and a different ROM interpolation table was necessary in VIP of FIG. 1 for a different format having a different number of scanning lines and a different vertical screen size.

In the present embodiment, a wide variety of formats can be automatically tracked by a set of EPROM and ROM interpolation table. This has been attained by discarding the unreliable actual scanning line coordinate system which disadvantageously changes format by format and by using the newly adapted virtual vertical coordinate system based upon hypothetical scanning lines having approximately four times the number of lines.

With reference to FIG. 14 again, the output of the ROM 41 is transmitted to a D-A converter 42 to be converted into an analog signal. The analog signal is supplied to a convergence coil 12 via a processing and amplifying section 43. At the convergence coil 12, the electron beam of the CRT undergoes supplementary deflection and the color shift is corrected. The processing and amplifying section 43 includes well-known LPF means for horizontal interpolation. In the LPF means, smoothing interpolation is performed among 16 samples arranged in the horizontal direction. Further, the processing and amplifying section 43 includes a well-known analog convergence circuit for performing coarse correction.

In FIG. 14, only one set of circuits are illustrated. However, the degree of freedom of color shift is four dimensional That is to say, correction in the vertical and horizontal direction is necessary for respective colors of red and blue. Four sets are required for the blocks 40, 42, 43 and 12 of FIG. 14. However, the block 41 can be commonly used among the four degrees of freedom. The description of the sixth embodiment of the present invention is terminated here.

Some versions will now be described.

The ROM 41 of FIG. 14 can be replaced by digital multipliers and digital adders for performing the computation of the expression (9).

If a conventional A-D converter with high speed (such as sampling rate of approximately 480 kHz) and high precision (such as approximately 12 bits) can be used in a portion including blocks 1, 2, 3', 4 and 5, it is possible to convert the input signal 19 into a 12-bit digital signal by using the A-D converter and use the 12-bit digital signal as the address signal.

Instead of the EPROM 41 shown in FIG. 14, an E$^2$PROM (Electrically Erasable and Programmable ROM) can be used.

In FIG. 14, the EPROM outputs two sets of data comprising the upper adjacent datum and the lower adjacent datum. Instead, however, an arbitrary number of sets ranging from 3 sets to 15 sets may be outputted, and a segmented curve interpolation formula based on the well-known Laglange interpolation polynomial or Hermite interpolation polynomial may be used as the computation formula instead of the linear interpolation formula (9). Or the Whittaer interpolation formula which is a mathematical model of an ideal low-pass filter may be used. (See "Electrical Communication Handbook", published by Ohm-Sha, Japan, in 1979, p. 32). In case the curve interpolation formula is used, it is advantageous to use digital computing elements because the capacity of the ROM 41 is extremely large.

On the assumption that the maximum range of required correction amount is 7 h indicated by the expression (5), the embodiment of FIG. 14 has been described. If instead the starting point is 50h of the expression (4), (i.e., if the analog convergence circuit is omitted), the necessary number of bits of a datum stored in the EPROM 40 becomes 7, and the necessary number of bits of the input to the DA 42 becomes 11. In this case, the necessary number of addresses of the ROM 41 becomes extremely large such as $2^7 \times 2^7 \times 2^8 = 2^{22} = 4M$ addresses even if the linear interpolation is used. Therefore, it is suitable to use digital computing elements instead of the ROM.

Based upon the expression (10) the minimum required number N of the hypothetical scanning lines for the present invention is typically established as $$N \geq \text{(the number of samples in the vertical direction)} \times \quad (11)$$

$$\left( \begin{array}{c} \text{maximum value of difference in necessary} \\ \text{correction amount between adjacent samples} \end{array} \right)$$

$$\left( \begin{array}{c} \text{magnitude of LSB of perception limit of} \\ \text{irregularity of luminance} \end{array} \right)$$

In the description of the sixth embodiment, N is calculated as $$N = 16 \times \frac{7h}{0.03h} \approx 16 \times 256 \quad (12)$$

$$= 4096 = 2^{12}$$

In the version described latest as well, the term of 7 h in the expression (10) is considered to be nearly unchanged as described later. In the above described calculation of the necessary number of addresses, therefore, the value $2^8 = 256$ is used.

The reason will now be described. As understood from FIG. 2, the maximum value of difference in necessary correction amount between adjacent samples is maximized at the upper end portion or the lower end portion of the screen. Its magnitude is estimated as approximately 3.3 h by dividing 50 h of the expression (4) by the number 15 of samples. It is considered that 7 h suffices even if other unknown factors are included. The above described reason has heretofore been described. Conversely, it can be said that the difference 7 h in the necessary correction amount between the upper and lower adjacent samples used in the expression (10) in the description of the sixth embodiment corresponds to the worst case where the performance of the analog convergence circuit included in the processing and amplifying section 43 of FIG. 14 is considerably bad. Even if the performance of the analog convergence circuit is excellent, however it is considerably difficult to make 7 h of the expression (10) below 7 h in industrially rational configuration. Therefore, the minimum value of the necessary number of hypothetical scanning lines per a sampling spacing becomes 4 h/0.03 h ≈ 130 lines Assuming that 16 samples in total are present, the value of approximately 2000 lines is obtained. That is to say, approximately twice or more lines as many as 1000 actual scanning lines supposed are needed.

Figure 15:
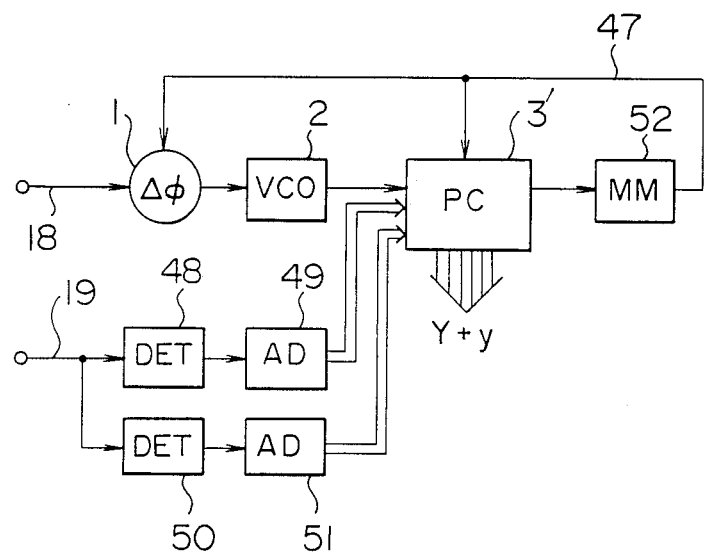
FIG. 15 is a circuit diagram of a primary part of a seventh embodiment according to the present invention.

FIG. 15 shows a seventh embodiment of the present invention.

In FIG. 15, components 1, 2, 3', 11, 12 and 14 are the same as those of FIG. 14. Numeral 52 denotes a monostable multivibrator. The output pulse width is so set as to be nearly equal to the pulse width of the vertical deflection retrace line separately produced. During the interval of the pulse width, the PC 3' stops its counting operation. During the retrace line interval, therefore, the output address signal of the PC 3' ceases from change. When the electron beam returns to the upper portion of the screen, the counting is resumed. Numeral 48 denotes an amplitude detector (DET) for detecting the positive peak of the inputted vertical deflection sawtooth wave signal, i.e., the size of the upper end of the screen as DC voltage. The output of the DET 48 is used to set the count start number of the PC 3' via an A-D converter 49.

Further, a DET 50 detects the negative peak as DC voltage. The output of the DET 50 is used to set the count end number of the PC 3' via an A-D converter 51. A similar object can be attained by using the peak-to-peak value detection and the average value detection of FIG. 14 as well as an computation circuit instead of the above described detection of the upper and lower ends performed in the circuits 48, 49, 50 and 51. The present embodiment is somewhat improved in traceability with respect to the scanning format of the input signal as compared with the sixth embodiment.

In both the sixth and seventh embodiments, the portion including the DET and AD can be omitted in application where only formats having nearly constant vertical screen sizes need be dealt with. In this case, the PC need not be a programmable counter, but need only be a counter which is reset every vertical period.

In application where the vertical screen size and the number of vertical scanning lines are nearly constant and only the horizontal scanning frequency and the horizontal screen size change format by format, it is possible to omit the circuits 1, 2, 4 and 5 of FIG. 14, replace PC 3' by a simple counter reset every vertical period and use a signal source having a nearly fixed frequency instead of the VCO 2. In such application as well, the present embodiment is effective because the number of scanning lines changes format by format.

Figure 16:
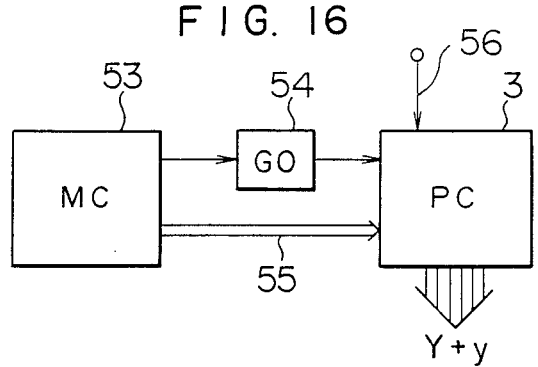
FIG. 16 is a circuit diagram of a principal part of an eighth embodiment according to the present invention.

FIG. 16 shows an eighth embodiment of the present invention. In FIG. 16, a block 3" is the same as the PC 3' of FIG. 14. Numeral 53 of FIG. 16 denotes a microcomputer having a register therein. Numeral 54 denotes a variable-frequency signal source supplied with an analog or digital signal as an input from the microcomputer 53. The signal source 54 controls the frequency of the output signal so that the frequency may become in proportion to the average speed of vertical scanning. Numeral 55 denotes a digital signal for setting the count start number of the programmable counter 3". Numeral 56 denotes a vertical retrace line pulse signal. At the tail edge of the pulse, i.e., at the time of end of a vertical retrace line, i.e., at the time of start of vertical scanning, the PC 3" is reset to return to the original start number and continue counting The above described variable-frequency signal source 54 can be easily realized by using a fixed-frequency oscillator having a sufficiently high frequency and a variable frequency-demultiplying counter, for example, together with a well-known technique. The digital output of the counter is connected to the circuit 40, 41 of FIG. 14. In the above described embodiment, formats having different vertical screen sizes and vertical deflection speeds can be dealt with by a register memory having an extremely small capacity.

Figure 17:
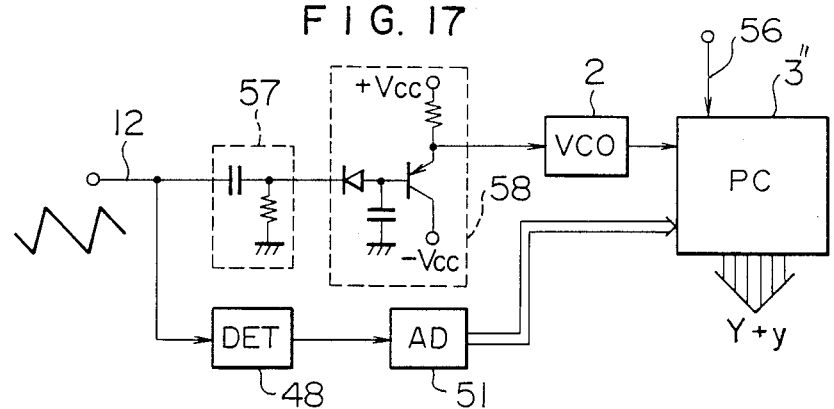
FIG. 17 is a circuit diagram of a principal part of a ninth embodiment according to the present invention.

A ninth embodiment of the present invention is shown in FIG. 17. In FIG. 17, blocks 2, 3", 48 and 51 are the same as those of FIG. 15. In FIG. 17, numeral 12 denotes a signal corresponding to the vertical deflection current. Numeral 57 denotes a differentiating circuit. A voltage proportional to the vertical deflection speed is obtained at the output of the differentiating circuit 57. Numeral 58 denotes a negative-side amplitude detector. The negative-side amplitude becomes in proportion to the so-called vertical deflection speed in the vertical scanning interval. In proportion to the negative-side amplitude, the frequency of the VCO 2 and hence the count speed of the PC 3" is controlled. Upon the tail edge of the vertical retrace line pulse 56, the PC 3" is reset, an address close to that desired is obtained at the output of PC 3". In case a high speed and high precision A-D converter is available in future, the elements 2, 3", 48, 51, 56, 57, 58 in FIG. 17 can be replaced by the single A-D converter. For such a use, the A-D converter must have a precision which is able to count hypothetical scanning lines more than two times that of an actual scanning line.

By using the embodiment of the present invention heretofore described, it becomes possible to implement a digital convergence circuit capable of dealing with formats of a wide variety of signal sources having different number of scanning lines while confining the requisite memory capacity of the EPROM to the minimum. The embodiment has a high industrial value.

Generation of the correction waveform for preventing the remaining color shift at the left end portion of the screen will be described by referring to a tenth embodiment of the present invention shown in FIG. 18. The operation of FIG. 18 will now be described by referring to the corresponding waveform diagram shown in FIG. 19 as well.

An input 18 of a phase detector 1 is supplied with horizontal retrace line pulses. The output of the phase detector 1 is applied to a frequency control terminal of a voltage controlled oscillator (hereafter abbreviated to VCO) 2. The oscillation output of the VCO 2 is applied to a trigger input terminal of a monostable multivibrator (hereafter abbreviated to MM) 60. The output pulse width Tr' of the MM 60 is so chosen as to become shorter than the width Tr of the retrace line interval of the horizontal retrace line pulse 18 by ΔTr. In typical application, ΔTr is chosen to be close to the transient response time of a convergence signal processing and amplifying section 70 located downstream. The transient response time of the section 70 is approximately one to two times as long as the rise time. The output of the MM 60 is applied to the input of a pulse delay circuit 61. The delay time $\tau d$ of the pulse delay circuit 61 is chosen to be nearly equal to the delay time of the convergence signal processing and amplifying section 70. The delayed pulse 68 is negatively fed back to the phase detector 1.

The circuits 1, 2, 60 and 61 constitute a PLL loop as a whole. As a result of PLL operation, the rising edge of the delayed pulse output 68 is aligned in timing with the rising edge of the inputted horizontal retrace line pulse as shown in FIG. 19. At the input side 19 of the pulse delay circuit 61, therefore, a preceding pulse having a rising edge preceding the rising edge of the pulse 68 by the pulse delay amount $\tau d$ as shown in FIG. 9 is obtained. This pulse is applied to an inverter 62. The peak-to-peak output value of the inverter 62 is in proportion to the power supply voltage Vcc and is proportionally controlled by controlling the Vcc by means of different means. The controlled output pulse is applied to an integrator 63 to produce a sawtooth wave 69 having the horizontal period at the output thereof The timing of the waveform 69 is shown in FIG. 19. The amplitude of the sawtooth wave is detected and held by a peak-to-peak value detector 64. Another peak-to-peak value detector 65 is supplied with sawtooth wave proportional to the horizontal deflection position at its input to detect and hold the peak-to-peak amplitude value corresponding to the horizontal screen size. As the sawtooth wave voltage proportional to the horizontal deflection position, the horizontal deflection current can be used instead. The difference between the outputs of the peak-to-peak value detectors 64 and 65 undergoes differential amplification in a comparison amplifier 66 and is supplied to the above described inverter 62 via an LPF 67 to apply negative feedback control to the power supply voltage thereof. As a result of the negative feedback operation, it is possible to make the amplitude of the output sawtooth wave depend upon the horizontal screen size. The output sawtooth wave is applied to a CY 12 via a convergence signal processing and amplifying section 70 to correct and control the position of the electron beam of the CRT. As a result, the color shift is corrected as a whole including the left end of the screen. Although only one CY is illustrated in FIG. 18, four CY's are typically used for the vertical direction of red, the horizontal direction of red, the vertical direction of blue and the horizontal direction of blue, respectively.

Figure 19:
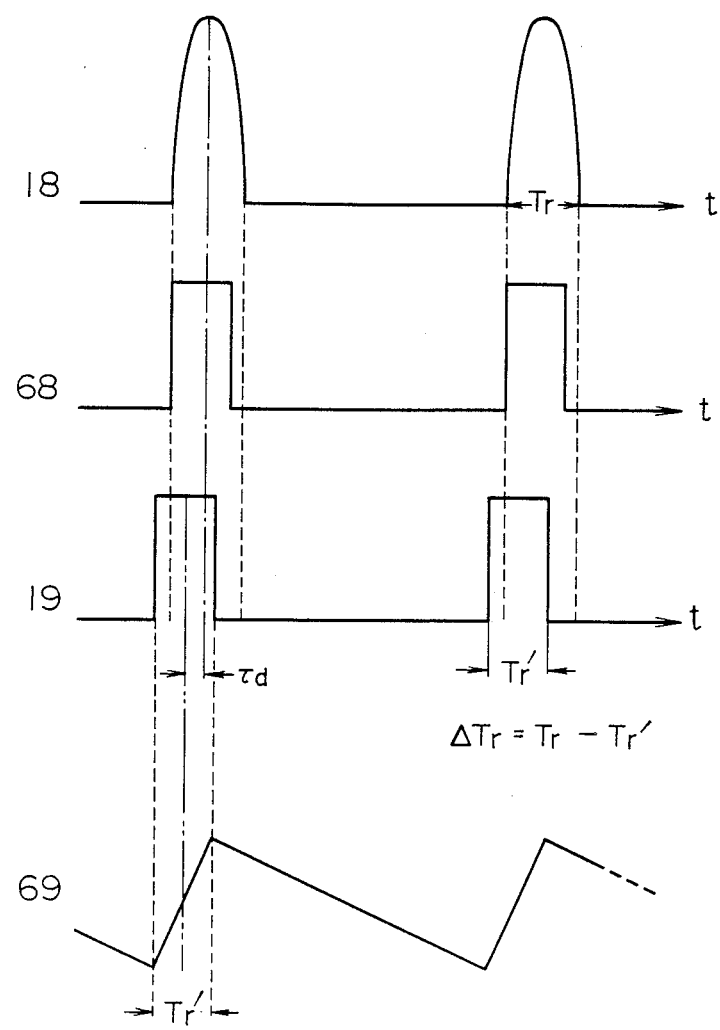
FIG. 19 shows waveforms of a principal part of the tenth embodiment according to the present invention.
Figure 20:
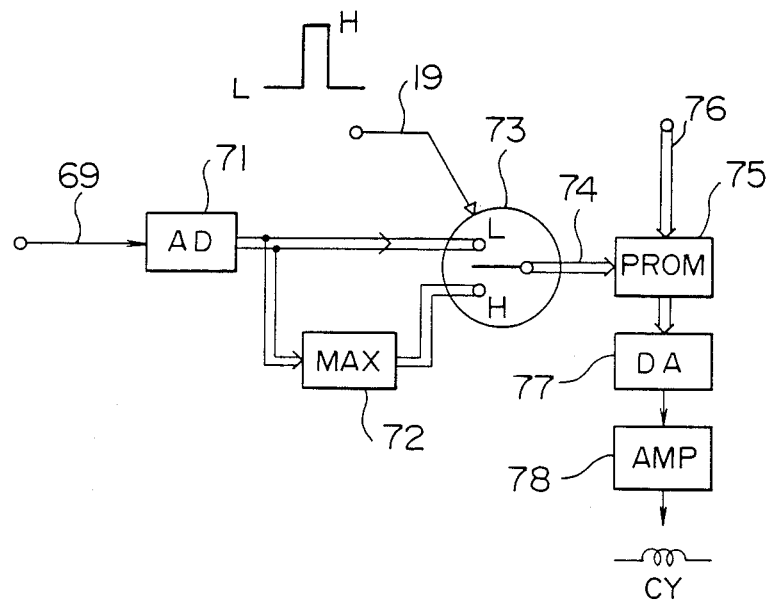
FIG. 20 is a circuit diagram of a principal part of an eleventh embodiment according to the present invention.
Figure 21:
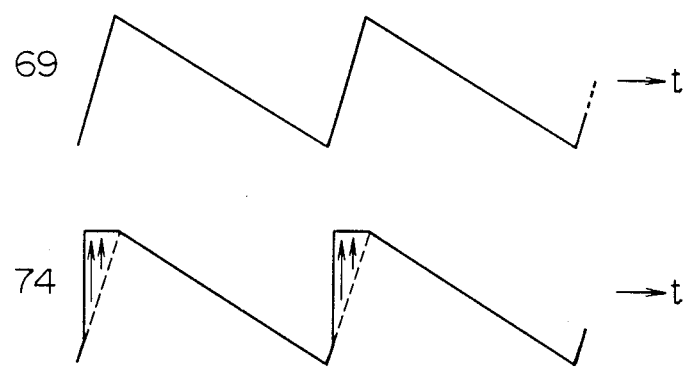
FIG. 21 shows waveforms of the principal part of the eleventh embodiment according to the present invention.

In case the present invention is applied to a digital convergence circuit using the digital technique, the value of the delay time $\tau d$ is typically longer than 2 to 3% of the above described horizontal period because it takes time to perform digital data transfer processing. To comply with the delay time $\tau d$, therefore, the delay time of the pulse delay circuit is chosen. Further, the digital address signal for specifying the horizontal coordinate of the electron beam on the screen can be obtained by digitizing the sawtooth wave 69 outputted in FIG. 18 by an A-D converter. This is shown in FIG. 20 as an eleventh embodiment In FIG. 20, the input of an A-D converter 71 is supplied with the preceding sawtooth wave 69 of FIGS. 18 and 19. Approximately 8-bit digitized address signal is outputted by the A-D converter 71. And the maximum address number corresponding to the left end of the screen is outputted by a maximum detection circuit 72. Upon receiving a supplementary input signal 19, i.e., the preceding retrace line pulse of FIG. 18, a digital multiplexer 73 selects the output address of the A-D converter 71 while the preceding pulse 19 is at "L", and selects the maximum address while the preceding pulse is at "H". At an output 74 of the multiplexer 73, therefore, a preceding address signal corresponding to a waveform 74 represented by solid lines in FIG. 21 is obtained. In the waveform 74, at least the waveform at the latter half is made to agree with the address of the left end portion of the screen to confine the influence of the transient oscillation of the convergence amplifying section at the left end portion of the screen to the minimum.

In FIG. 20, a datum for correcting the color shift is stored at each address of a programmable read only memory (PROM) 75. An address of the PROM 75 is defined by a vertical coordinate specifying address supplied by different means and the above described horizontal address A digital datum is thus obtained at the output of the PROM 75. The datum is converted into an analog signal by a D-A converter 77 and amplified by an amplifying section 78. The CY is driven by the amplified signal. Finally, the color shift on the screen is corrected. The operation of the maximum detection circuit 72 and the multiplexer 73 has been described assuming that the signal is processed in the digital signal domain. However, it is also possible to process the signal in the domain of the analog signal 74. As well known, the amount of information delay caused by digital processing is typically in proportion to integer times the clock period. Accordingly, it is suitable to produce the amount of information delay by providing a delay element causing delay equivalent to the integer times the clock period in addition to the delay caused by the fixed delay element 61 of FIG. 18. By doing so, it is possible to automatically match and track a change of the horizontal scanning period of the input signal. Description of the eleventh embodiment is terminated here.

Figure 18:
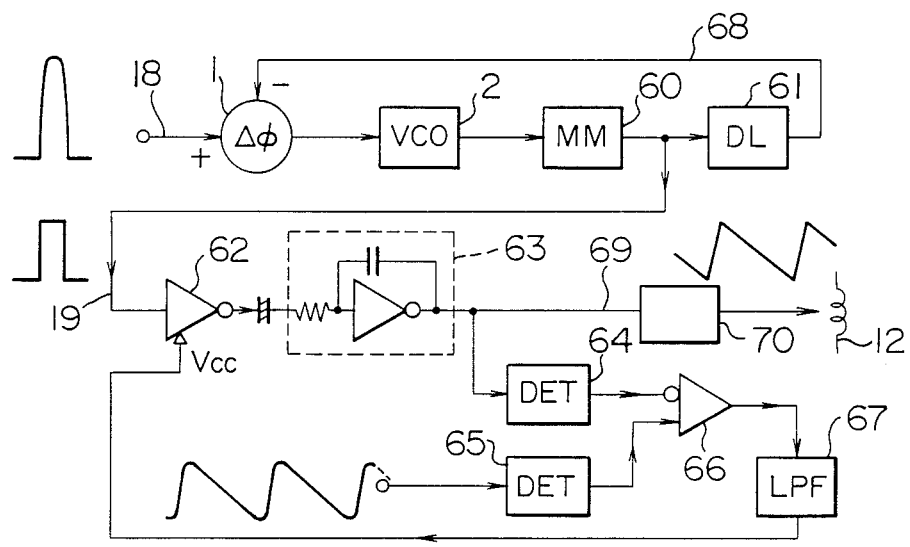
FIG. 18 is a circuit diagram of a tenth embodiment of the present invention.
Figure 22:
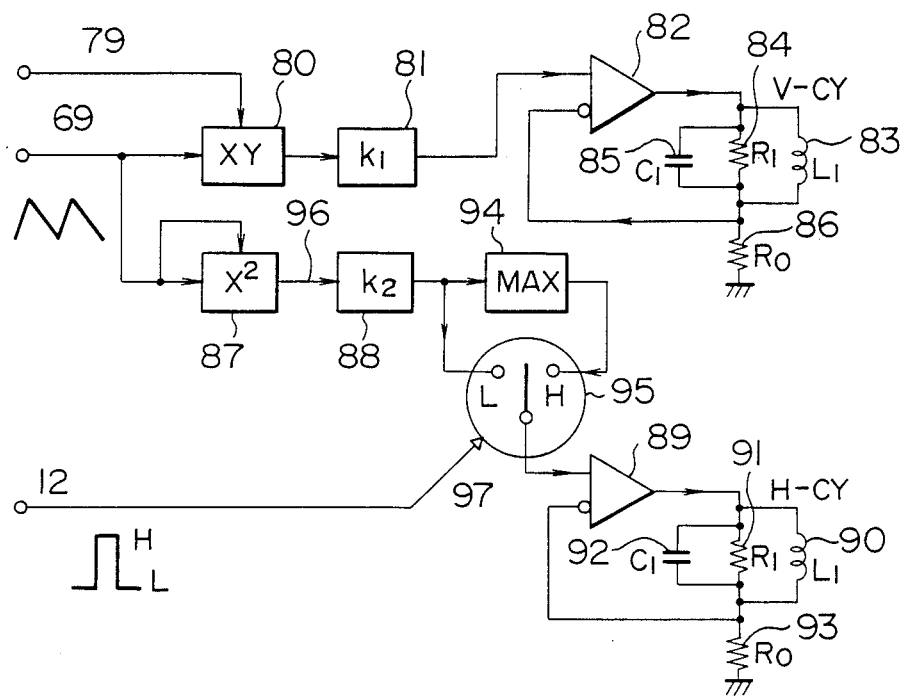
FIG. 22 is a circuit diagram of a principal part of a twelfth embodiment according to the present invention.

An example using an analog circuit for the convergence signal processing and amplifying section 70 of FIG. 18 is shown in FIG. 22 as a twelfth embodiment. In FIG. 22, numeral 69 denotes a wave identical with the preceding horizontal sawtooth wave 69 of FIG. 19. Numeral 79 denotes a vertical sawtooth wave. Although not illustrated in FIG. 22, a current flowing through the vertical deflection coil is taken out as voltage across a serially connected resistor by well-known means to produce the vertical sawtooth wave 79. A multiplier 80 is supplied with the preceding horizontal sawtooth wave 69 and the vertical sawtooth wave 79. The multiplier 80 thus outputs the product of the two input signals As the multiplier 80, ICMC-1495L produced by Motorola, USA, for example, may be used. The circuit of the present embodiment further includes a gain adjusting circuit 81, a negative-feedback power amplifier 82, inductance ($L_1$) 83 of the vertical convergence yoke (V-CY), stray capacitance ($C_1$) 85 of the V-CY and a dumping resistor ($R_1$) 84. This circuit corrects the keystone distortion shown in FIG. 2 by means of expansion and compression in the vertical direction.

This negative feedback circuit makes a current $I_0$ flowing through $R_0$ track the input waveform. Assuming a current flowing through the actual V-CY is $I_1$, therefore, $I_1$ is represented by the output of a low-pass filter supplied with the input $I_0$ as $$\frac{I_1}{I_0} = \frac{1}{1 + 2\zeta\tau p + (\tau p)^2} \quad (13)$$

where
$p = j\omega$ $$\tau = \sqrt{L_1 C_1} \quad (14)$$

$$2\zeta = \frac{1}{R_1}\sqrt{\frac{L_1}{C_1}}.$$

An example of a set of constants in application to a horizontal scanning frequency $f_H \approx 53$ kHz is indicated below.

$L_1 = 30\ \mu H,\ C_1 = 120\ pF,\ R_1 = 160\ \Omega$ and $R_0 = 1\ \Omega$ therefore $\tau = L_1 C_1 \approx 60$ m sec, $2\zeta \approx 1.6$ Accordingly, the cut-off frequency fc of the expression (13) is close to $$\frac{1}{2\pi\tau} \approx 2.6\ \text{MHz.}$$

Therefore, the rise time of a step response is close to $$\frac{1}{2fc} \approx 0.2\ \mu\text{sec.}$$

Further, its delay time is represented as $\tau d \approx 2\zeta\tau \approx 0.1\ \mu\text{sec.}$ Further, the bandwidth of the negative feedback amplifier 82 in a closed loop is typically approximately 0.8 MHz. Accordingly, the delay of the current $I_0$ itself with respect to the input is approximately 0.3 μsec, and its rise time becomes approximately 0.6 μsec.

By adding the above described delays, therefore, the total delay time of the circuit shown in FIG. 22 becomes approximately 0.4 μsec. On the basis of rms rule, the total rise time becomes $(0.2\ \mu\text{sec})^2 + (0.6\ \mu\text{sec})^2 \approx 0.63\ \mu\text{sec.}$ The rise time of the step response can be nearly regarded as the primary transient oscillation time of the system. Therefore, the already described $\tau d$ and $\Delta Tr$ of FIG. 19 are respectively set as $\tau d \approx 0.4\ \mu\text{sec}$ \quad (15)

$\Delta Tr \approx 0.63\ \mu\text{sec.}$

That is to say, the value of $\tau d$ is equivalent to approximately 2% of the horizontal period $1/53$ kHz $\approx 16\ \mu$sec.

Description of the upper half of FIG. 22 is terminated here. The lower half of FIG. 22 will now be described. The lower half is provided for correcting the color shift of red and blue vertical lines (i.e., so-called horizontal linearity distortion).

Figure 23:
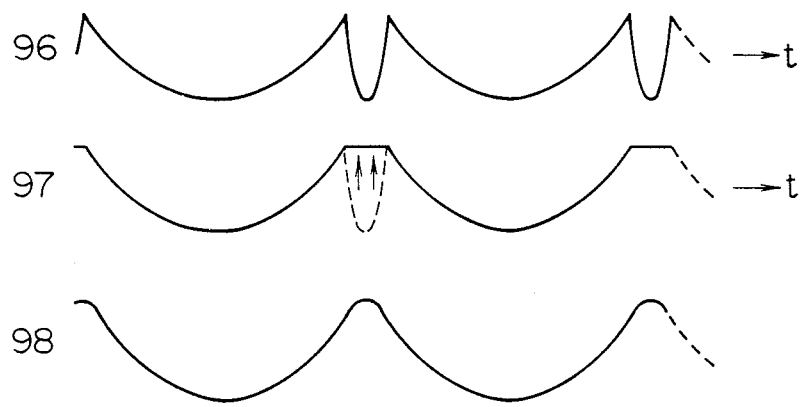
FIG. 23 shows waveforms of the principal part of the twelfth embodiment according to the present invention.

In FIG. 22, the output 96 of a multiplier 87 has a waveform 96 shown in FIG. 23. In accordance with the change of the above described horizontal preceding pulse 19 of FIG. 18 between "H" and "L" levels, a gain adjusting section 88, a maximum value detecting and holding circuit 94 and an analog switch 95 produce an output represented by a waveform 97 of FIG. 23. That is to say, steep change portions within horizontal retrace line intervals are leveled. Otherwise, the succeeding negative feedback amplifying section 89 lacks in tracking speed. Because of an inductance load, a steep change of current causes overvoltage saturation. Numeral 90 denotes a horizontal convergence yoke H-CY. Numerals 91, 92 and 93 denote the same components as 84, 85 and 86, respectively.

In the prior art, an integrating circuit was simply used as the parabolic wave generating means located at the lower half of FIG. 22. In such configuration, it was not necessary to use the retrace line interval leveling circuit 94 and 95 of FIG. 22 because a waveform 98 shown in FIG. 23 is obtained. However, the integration scheme has a drawback that a change of the horizontal scanning frequency $f_H$ cannot be tracked. Because the output amplitude of the integrating circuit is attenuated to half when $f_H^{-1}$ is reduced to half, for example. As a result, the color shift remains by half. In the scheme of FIG. 22, this drawback is overcome.

Figure 24:
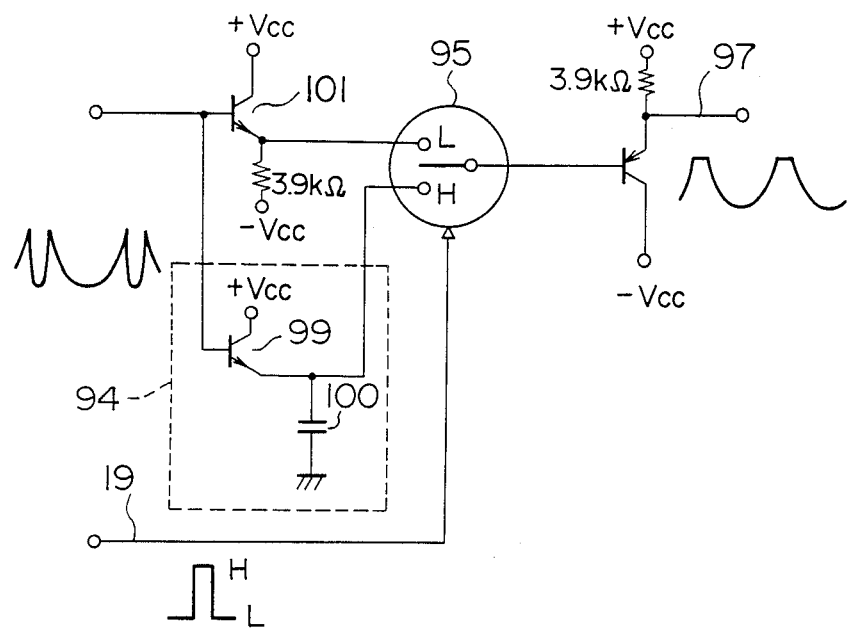
FIG. 24 is a circuit diagram of a maximum value detecting and holding circuit illustrated in FIG. 22.

The concrete configuration of the maximum value detecting and holding circuit 94 of FIG. 22 is shown in FIG. 24. The maximum value is detected and held by a transistor 99 and a capacitor 100 surrounded by a broken line of FIG. 24. The on-state base-emitter potential difference of the transistor 99 is nearly equal to the base-emitter potential difference of an emitter follower 101. The value of the capacitor 100 is defined to be approximately 10 m$\mu$F or more so that the maximum value may be held during the horizontal retrace line interval.

Description of the tenth embodiment is terminated here. Only one convergence output section is shown in each of FIGS. 18 and 20. In FIG. 22, only two convergence output sections are shown. In reality, however, at least four convergence output sections are used for the vertical direction of red, the horizontal direction of red, the vertical direction of blue and the horizontal direction of blue.

Figure 25:
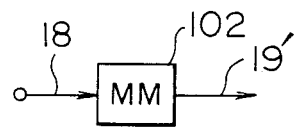
FIG. 25 is a circuit diagram of a principal part of a thirteenth embodiment according to the present invention.

FIG. 25 shows a primary part of a thirteenth embodiment. The thirteenth embodiment is a simplified version of the embodiment of FIG. 18. In FIG. 25, a monostable multivibrator 102 generates an output pulse 19', which is supplied to the inverter 62 instead of 19 shown in FIG. 18. That is to say, blocks 1, 2 and 60, 61 of FIG. 18 are omitted in the present embodiment. An input 18 of FIG. 25 is the horizontal retrace line pulse 19' of FIG. 26 and is identical with 19 of FIG. 18. As represented by 19' of FIG. 26, the output pulse 19' agrees with the input in the rising edge while its falling edge is set by the MM 102. The pulse width Tr' of the output pulse 19' is narrowed by K as compared with the pulse width of the input pulse. The magnitude of K is defined to be approximately twice the delay time $\tau d$ of the succeeding amplifier.

Figure 26:
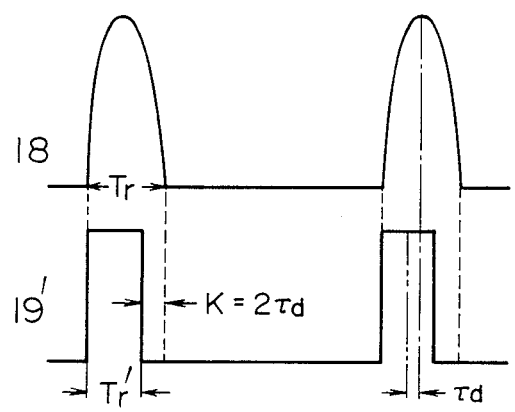
FIG. 26 shows waveforms of the principal part of the thirteenth embodiment.

As understood by comparing the waveform diagram of FIG. 19 corresponding to the embodiment of FIG. 18 with FIG. 26 of the present embodiment, common property is that the "centroid" of the retrace line pulse is advanced by the delay time $\tau d$ of the succeeding amplifier section. By substituting exemplified numerical values of the expression (15), it is indicated that the decrease of the pulse width of the preceding pulse is 0.63 $\mu$sec in the embodiment of FIG. 19 while the decrease is 0.8 $\mu$sec in the embodiment of FIG. 26. As the pulse width is reduced, the succeeding amplifier section must perform the retrace line operation in a shorter time, resulting in disadvantage. Since the difference is comparatively small in the above described example, however, the embodiment of FIG. 25 also has a practical value.

Figure 27:
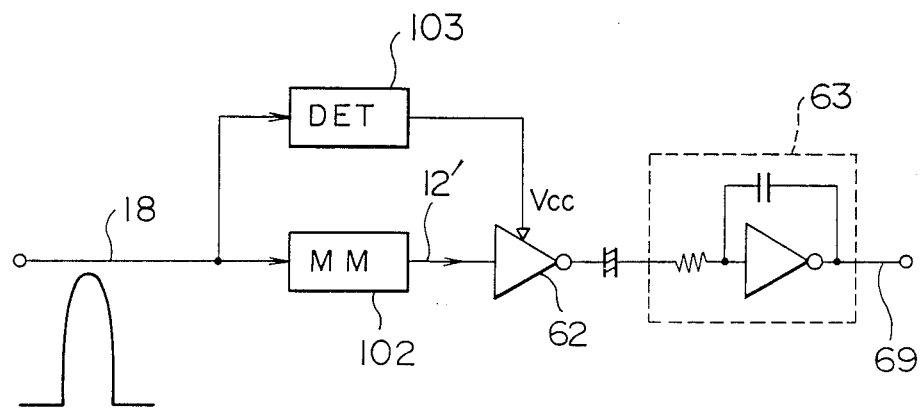
FIG. 27 is a circuit diagram of a principal part of a fourteenth embodiment according to the present invention.
Figure 28:
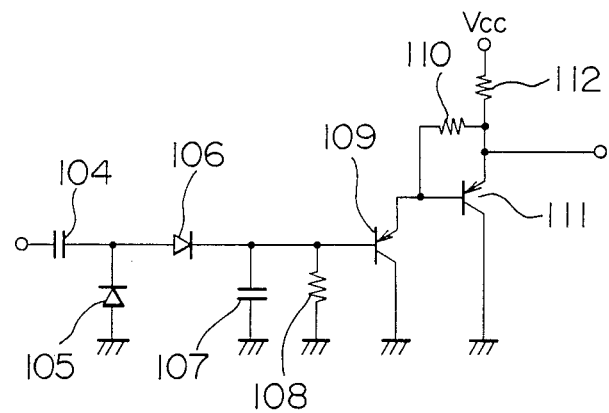
FIG. 28 is a circuit diagram of an amplitude detecting and holding circuit shown in FIG. 27.

FIG. 27 shows a fourteenth embodiment, in which the circuit of FIG. 18 including the remaining circuit portion is simplified. In FIG. 27, the circuit represented by numerals 18 and 102 functions in the same way as that of FIG. 25, and the circuit represented by numerals 62, 63 and 69 functions in the same way as that of FIG. 18. FIG. 28 shows a concrete example of the amplitude detecting and holding circuit 103. In the amplitude detecting and holding circuit 103, a capacitor 104, a diode 105, a peak-to-peak amplitude detection circuit 106, a capacitor 107 and a resistor 108 constitute a holding circuit, while a transistors 109 and 110 as well as resistors 111 and 112 constitute a circuit serving as both an emitter follower buffer and a diode temperature compensation circuit. At the output, the peak-to-peak value of the horizontal retrace line pulse input 18 is detected as DC voltage. Accordingly, the peak-to-peak value of the output pulse of the inverter 62 shown in FIG. 27 is equivalent to the peak-to-peak value of the input retrace line pulse. Therefore, the desired sawtooth wave output proportional to the above described peak-to-peak value is obtained at the output of the integrator 63. In the configuration of FIG. 27, the components 64, 65, 66 and 67 used in the configuration of FIG. 18 is replaced by the component 103.

If the input pulse of FIG. 27 does not contain a DC component like the output of a pulse transformer, the DET 103 can be replaced by the maximum value detecting circuit 94.

In another version of the present invention, the delay time of the convergence processing and amplifying section is compensated by delaying a waveform by (integer times the horizontal period minus the delay time) in delay means instead of making the waveform precede the main horizontal deflection current waveform. In this case as well, a substantially identical effect is obtained The present invention includes such a version. Such delay means is not suitable in case of analog devices because of the resultant large scale. In case of digital devices however, such delay means can be easily attained.

The effects of the present invention has heretofore been described mainly in view of the color shift correction precision. However, power saving attained as an incidental effect of the present invention will now be supplementally described. In the twelfth embodiment shown in FIG. 22, a current containing the sawtooth wave component of the horizontal period flows through the V-CY 83. Across the V-CY, i.e., at the output of the amplifying section, therefore, pulse voltage resulting from differentiation of the current waveform is obtained. In the prior art, this pulse waveform is similar to the horizontal retrace line pulse 18 of FIG. 19. As well known, the horizontal deflection circuit performs free oscillation with half period in the horizontal retrace line period. Accordingly, processing based upon the deflection current waveform necessarily generates a sinusoidal wave. On the other hand, rectangular pulses are generated according to the present invention as shown in FIGS. 19 and 26. Therefore, the waveform of the correction current flowing through the V-CY of FIG. 19 is a rectilinear sawtooth wave similar to the waveform 69 of FIG. 19 when viewed in the horizontal period. The output voltage waveform corresponding to the correction current has a rectangular pulse.

For changing the current flowing through the inductor L by a predetermined amount $I_{pp}$, the voltage-time product equivalent to the predetermined $LI_{pp}$ must be applied. This is a general property Supposing that the pulse time widths are equivalent each other, therefore, the peak voltage amplitude of a sinusoidal wave required for causing a change of the predetermined $LI_{pp}$ is $\pi/2 \approx 1.57$ times that of a rectangular wave. The power supply voltage of the amplifying section 32 must be set higher by that amount. Accordingly, the dissipated power of the power supply is increased to 1.57 times. Conversely speaking, a power saving effect is obtained owing to the present invention.

A circuit for generating a parabolic signal capable of performing normal screen correction even if the deflection frequency is changed and the screen size is changed will now be described.

Figure 29:
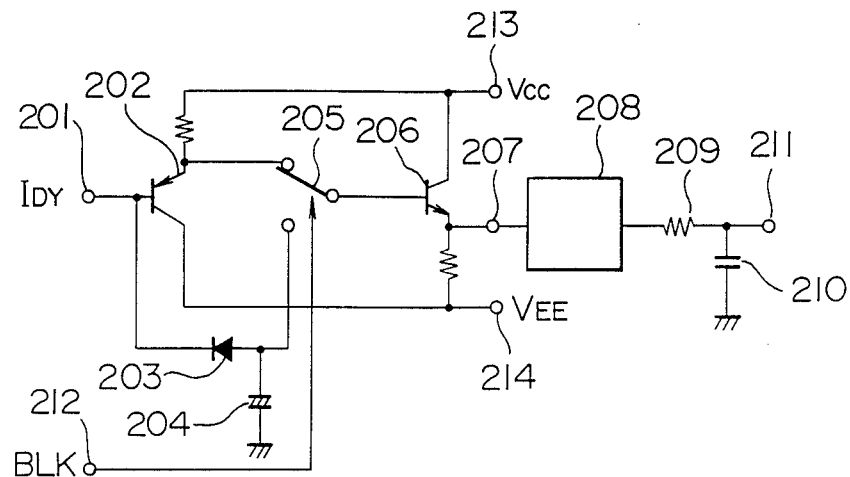
FIG. 29 is a circuit diagram of a parabolic signal generating circuit.
Figure 30:
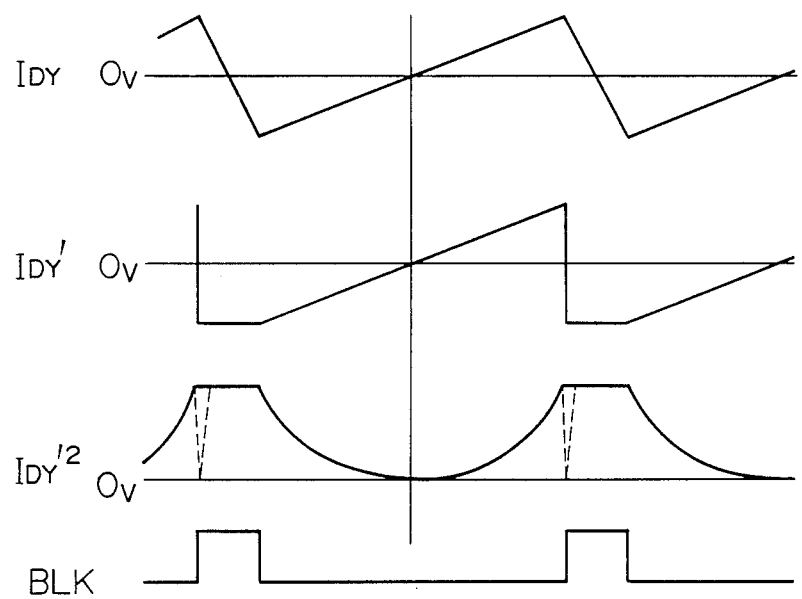
FIGS. 30 and 31 show waveforms of principal parts of the present invention.

FIG. 29 shows a circuit for generating the parabolic signal. FIG. 30 shows its timing chart. The parabolic signal generating circuit includes a deflection current input terminal 201, a buffer transistor 202, a diode 203, a cpacitor 204, an analog switch 205, a buffer transistor 206, a multiplier 208, a resistor 209 and a capacitor 210. The diode 203 and the capacitor 204 constitute a peak hold circuit. The resistor 209 and the capacitor 210 constitute a low-pass filter.

A deflection signal $I_{DY}$ shown in FIG. 30 is supplied to the input terminal 201. The deflection signal $I_{DY}$ is supplied to one of inputs of an analog switch 205 via a buffer transistor 202 and is also supplied to the peak hold circuit. In the peak hold circuit, a negative peak is held. The analog switch 205 is switched by a blanking signal BLK to output the signal IDY during the scanning period and output the output of the peak hold circuit during the blanking period. As a result, a signal $I_{DY}'$ of FIG. 30 is outputted at a terminal 207.

The signal $I_{DY}'$ is squared by the multiplier 208 to produce a parabolic signal $I_{DY}'^2$ illustrated in FIG. 30.

A portion of waveform $I_{DY}'^2$ indicated by broken lines is equivalent to square of a portion of the waveform $I_{DY}'$ steeply changing from a positive peak to a negative peak. Since a portion of the parabolic waveform indicated by broken lines is very small in width, it can be easily removed by the filter circuit (209, 210) so that the parabolic waveform during the scanning period will not be affected. As represented by $I_{DY}'^2$ the parabolic waveform obtained at the output terminal 211 is flat during a blanking interval and is smooth in a portion corresponding to a blanking period in transistion from a scanning interval to another scanning interval.

It is now assumed that a parabolic waveform is produced from the waveform $I_{DY}$ by using only a multiplier without using the peak hold circuit as illustrated in FIG. 29 and a parabolic waveform current is let flow through a coil (not illustrated) for distortion correction to correct the deflection distortion. The result obtained in this will now be described by referring to FIG. 31.

Figure 31:
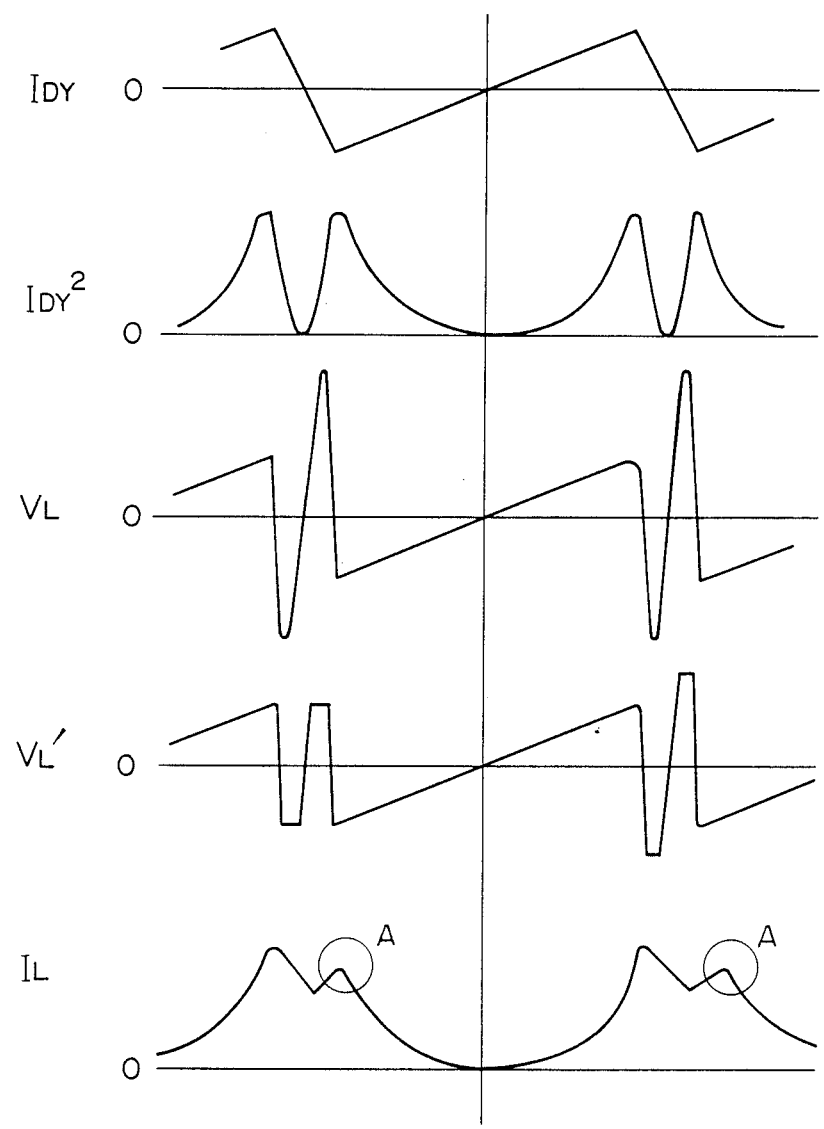

A deflection current waveform $I_{DY}$ shown in FIG. 31 is squared by a multiplier to produce a parabolic waveform $I_{DY}^2$.

If a parabolic current having the waveform $I_{DY}^2$ of FIG. 31 is let flow through a coil for distortion correction (not illustrated), a large sawtooth wave voltage as represented by $V_L$ of FIG. 31 is generated in the correction coil during a blanking interval by a narrow width parabolic current in the blanking interval. This large voltage causes saturation of the output amplifier and then hunting, resulting in a bad influence upon the screen. It is now supposed that the peak of the sawtooth wave is clipped by a limiter (not illustrated) as represented by $V_L'$ in FIG. 31. Because the voltage is made constant, the current flowing through the correction coil does not change like a parabolic waveform but changes as represented by $I_L$ of FIG. 31. Therefore, it is not possible to let flow a current having a correct parabolic waveform at a start portion of a scanning interval represented by A in FIG. 31.

Therefore, it is understood that the method used in the above described embodiment comprising the steps of holding the peak of the waveform $I_{DY}$ beforehand, squaring the peak, and deriving a parabolic waveform having a flat level during the blanking period provides very effective means for attaining the object of the present invention.

The present invention makes it possible to correct the color shift at the left end portion of a display screen with high precision. Hence, a picture with higher precision can be displayed over a wider screen range. In application such as a computer graphics display having one million or more pixels, therefore, the present invention has a high industrial value.

The present invention makes it possible to implement a digital convergence circuit capable of dealing with formats of a wide variety of signal sources having different number of scanning lines while confining the required memory capacity of EPROM to the minimum.

The present invention makes it possible to constitute a digital convergence circuit capable of tracking a wide variety of signal source formats and correcting the color shift. As a result, displays can be used in various application fields.

We claim:

1. A convergence correction circuit used in a display apparatus with CRT wherein on the basis of color shift correction digital data corresponding to even-numbered and odd-numbered representative grid points put in sequence in the horizontal direction of a screen, wherein eventh order and oddth order being allocated alternatively, color shift correction amounts of remaining points are derived by interpolation in the horizontal direction from adjacent data of an even-numbered representative grid point and of an odd-numbered representative grid point, said convergence correction circuit comprising:

triangular wave generating means for generating symmetric triangular waves having a period equivalent to twice the space between the representative grid points; and weighted average circuit means connected to said triangular wave generating means so as to derive interpolated correction amounts based upon weighted summation of the color shift correction data of an even-numbered representation grid point and the color shift correction data of an odd-numbered representative grid point by using said symmetric triangular waves.

2. In a multi-scan display using CRT including color shift correction data memory means for memorizing color shift correction data at approximately nxm representative grid points arranged in vertical and horizontal directions of the screen, and correction data generating means for generating color shift correction data at remaining points from said color shift correction data on the basis of a vertical interpolation principle, convergence correction being performed in said display, a digital convergence correction circuit comprising:

address signal generating means for generating a vertical address signal as a digital signal on the basis of a virtual vertical coordinate system based upon hypothetical scanning lines, the number of which is more than two times that of actual scanning lines of a signal source;

said virtual vertical coordinate system being independent of actual scanning line numbers and being commonly used for different signal sources which have different actual scanning line numbers;

said address signal generating means generating an address signal and supplying said address signal to said color shift correction data memory means;

said correction data generating means deriving a color shift correction amount at a point on a vertical line passing through representative grid points by applying vertical interpolation on the basis of said virtual vertical coordinate system to color shift correction data at said representative grid points read out from said correction data memory means on the basis of said address signal; and said address signal generating means including counter means, and a difference between a count start point and a count end point of said counter means being set to be nearly in proportion to the screen size.

3. A digital convergence correction circuit according to claim 2, wherein the LSB of data at said representative grid points is provided with a coarse magnitude close to the limit of color shift perception to reduce the necessary number of bits, and the LSB of vertically interpolated data at a point on a vertical line passing through said representative grid points is provided with a small magnitude corresponding to the perception limit of irregularity of luminance.

4. In a multi-scan display apparatus using a CRT, a convergence correction circuit comprising:

convergence yoke means for performing color shift correction;

processing and amplifying means for driving said yoke;

horizontal sawtooth wave signal generating means for supplying horizontal sawtooth waves to said processing and amplifying means; and said sawtooth wave signal generating means generating a preceding sawtooth wave of horizontal scanning period, said preceding sawtooth wave preceding a main horizontal deflection sawtooth wave current by an interval nearly equivalent to the delay time of said processing and amplifying means;

wherein retrace line interval width of said preceding sawtooth wave is made narrower than the retrace line interval width of main horizontal deflection by an interval nearly equivalent to transient response time of said processing and amplifying means.

5. A convergence correction circuit according to claim 4, wherein said processing and amplifying means includes squaring means for squaring said preceding sawtooth wave, so that color shift on the screen may be corrected by output of said squaring means.

6. A convergence correction circuit according to claim 4, wherein said horizontal sawtooth wave signal generating means includes means for delaying the main horizontal deflection sawtooth wave signal by an interval chosen to be nearly equal to the difference obtained by subtracting the delay time of said processing and amplifying means from the horizontal period.

7. In a multi-scan display apparatus using a CRT, a convergence correction circuit comprising:

convergence yoke means for performing color shift correction;

processing and amplifying means for driving said yoke;

horizontal sawtooth wave signal generating means for supplying horizontal sawtooth waves to said processing and amplifying means; and said sawtooth wave signal generating means generating a preceding sawtooth wave of horizontal scanning period, said preceding sawtooth wave preceding a main horizontal deflection sawtooth wave current by an interval nearly equivalent to the delay time of said processing and amplifying means;

wherein the value during the retrace line interval of said preceding sawtooth wave is kept at a value corresponding to the left end portion of the screen.

* * * * *